US012625723B2

(12) United States Patent
Lahav et al.

(10) Patent No.: US 12,625,723 B2
(45) Date of Patent: May 12, 2026

(54) COUNTERS FOR ENSURING TRANSACTIONAL ORDERING IN I/O AGENT

(71) Applicant: Apple Inc., Cupertino, CA (US)

(72) Inventors: Sagi Lahav, Kiryat Bialik (IL); Lital Levy-Rubin, Tel Aviv (IL); Gaurav Garg, San Jose, CA (US); Gerard R. Williams, III, Los Altos, CA (US); Samer Nassar, Nazareth (IL); Per H. Hammarlund, Sunnyvale, CA (US); Harshavardhan Kaushikkar, San Jose, CA (US); Srinivasa Rangan Sridharan, Santa Clara, CA (US); Jeff Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1029 days.

(21) Appl. No.: 17/657,524

(22) Filed: Mar. 31, 2022

(65) Prior Publication Data

US 2023/0063676 A1 Mar. 2, 2023

Related U.S. Application Data

(60) Provisional application No. 63/175,877, filed on Apr. 16, 2021.

(51) Int. Cl.
| | |
|---|---|
| *G06F 9/46* | (2006.01) |
| *G06F 9/30* | (2018.01) |
| *G06F 9/32* | (2018.01) |
| *G06F 9/50* | (2006.01) |

(52) U.S. Cl.
CPC .......... *G06F 9/467* (2013.01); *G06F 9/30079* (2013.01); *G06F 9/321* (2013.01); *G06F 9/5016* (2013.01)

(58) Field of Classification Search
CPC ...... G06F 9/467; G06F 9/30079; G06F 9/321; G06F 9/5016
See application file for complete search history.

(56) References Cited

U.S. PATENT DOCUMENTS

| | | | | | |
|---|---|---|---|---|---|
| 4,748,617 | A | * | 5/1988 | Drewlo .................. | H04L 12/44 398/100 |
| 6,526,462 | B1 | * | 2/2003 | Elabd ................... | G06F 9/5016 710/242 |

(Continued)

*Primary Examiner* — Hiren P Patel
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to an I/O agent circuit. The I/O agent circuit may include a transaction pipeline and a pool of counters. The I/O agent circuit may initialize a first counter included in the pool of counters with an initial counter value. The I/O agent circuit may assign the first counter to a specific transaction type. The I/O agent circuit may increment the first counter as a part of allocating a transaction of a transaction type included in a set of transaction types different than the specific transaction type. Based on receiving a transaction request to process a first transaction of the specific transaction type, the I/O agent circuit may bind the first transaction to the first counter. The I/O agent circuit may issue the first transaction to the transaction pipeline based on a counter value stored by the first counter matching the initial counter value.

20 Claims, 17 Drawing Sheets

(56) References Cited

U.S. PATENT DOCUMENTS

| | | | | |
|---|---|---|---|---|
| 6,681,283 | B1 * | 1/2004 | Thekkath | G06F 12/0815 |
| | | | | 710/305 |
| 7,062,606 | B2 * | 6/2006 | Ober | G06F 12/126 |
| | | | | 712/E9.055 |
| 7,171,530 | B1 * | 1/2007 | Cruz-Rios | G06F 12/023 |
| | | | | 710/52 |
| 8,554,967 | B2 * | 10/2013 | Deshpande | G06F 13/385 |
| | | | | 710/100 |
| 8,930,680 | B2 * | 1/2015 | Robinson | G06F 12/0897 |
| | | | | 712/218 |
| 9,268,970 | B2 * | 2/2016 | Grafton | G06F 21/74 |
| 9,417,821 | B2 * | 8/2016 | Slaight | G06F 3/0673 |
| 9,569,385 | B2 | 2/2017 | Ahmad et al. | |
| 9,727,466 | B2 * | 8/2017 | Tune | G06F 12/0833 |
| 9,892,072 | B2 * | 2/2018 | Tune | G06F 13/4282 |
| 9,977,482 | B2 * | 5/2018 | Varma | G06F 1/324 |
| 10,445,219 | B1 * | 10/2019 | Roy | G06F 11/3656 |
| 10,795,820 | B2 * | 10/2020 | Mannava | G06F 11/1474 |
| 11,373,024 | B1 * | 6/2022 | Goyal | G06F 30/3308 |
| 11,675,722 | B2 * | 6/2023 | Kolor | G06F 13/4022 |
| | | | | 710/306 |
| 2003/0225874 | A1 * | 12/2003 | Blackmore | H04L 47/27 |
| | | | | 709/223 |
| 2004/0117784 | A1 * | 6/2004 | Endoh | G06F 21/10 |
| | | | | 717/169 |
| 2008/0106386 | A1 * | 5/2008 | Li | H04L 9/3273 |
| | | | | 340/10.5 |
| 2008/0256073 | A1 * | 10/2008 | Detlefs | G06F 9/528 |
| 2014/0229953 | A1 * | 8/2014 | Sevastiyanov | G06F 9/4881 |
| | | | | 718/102 |
| 2016/0005208 | A1 * | 1/2016 | Liao | G06T 15/005 |
| | | | | 345/422 |
| 2019/0087224 | A1 * | 3/2019 | Vrind | G06F 9/4818 |
| 2019/0306134 | A1 | 10/2019 | Shanbhogue et al. | |
| 2020/0371970 | A1 | 11/2020 | Chachad et al. | |
| 2020/0403942 | A1 | 12/2020 | Kaushik et al. | |
| 2022/0107836 | A1 * | 4/2022 | Hammarlund | G06F 13/4027 |

* cited by examiner

*800*

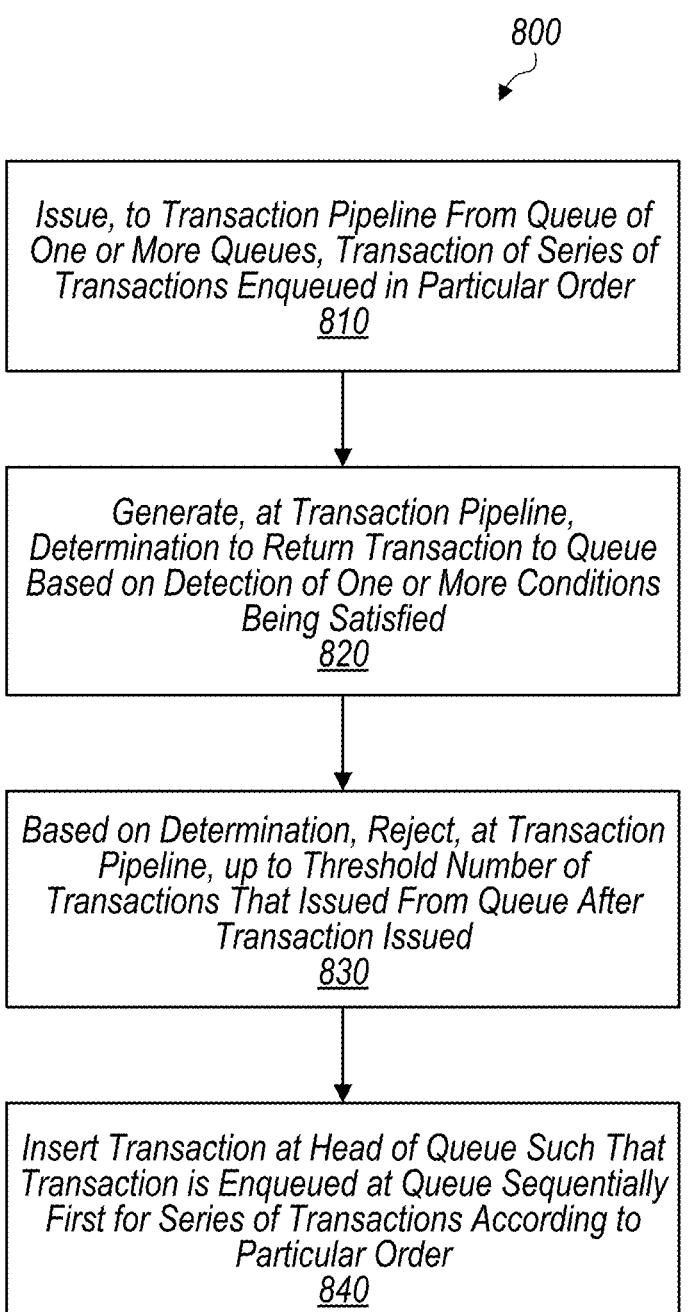

Issue, to Transaction Pipeline From Queue of One or More Queues, Transaction of Series of Transactions Enqueued in Particular Order
810

Generate, at Transaction Pipeline, Determination to Return Transaction to Queue Based on Detection of One or More Conditions Being Satisfied
820

Based on Determination, Reject, at Transaction Pipeline, up to Threshold Number of Transactions That Issued From Queue After Transaction Issued
830

Insert Transaction at Head of Queue Such That Transaction is Enqueued at Queue Sequentially First for Series of Transactions According to Particular Order
840

*FIG. 8*

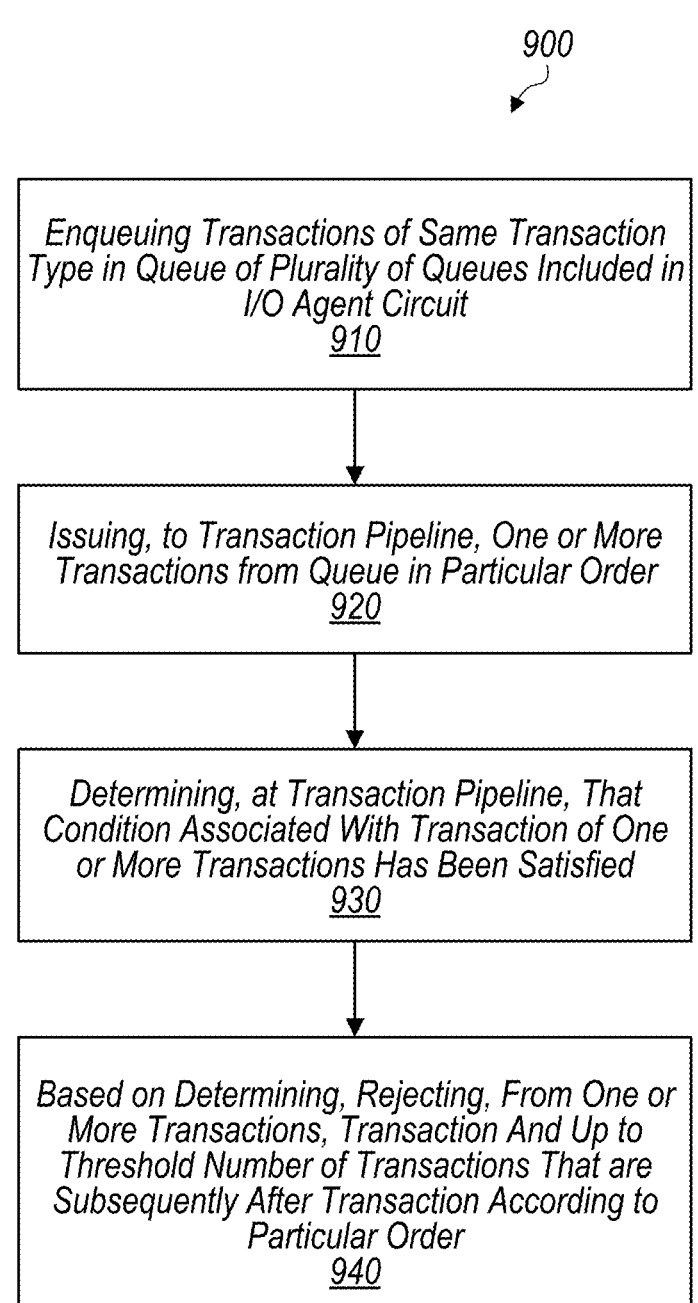

*900*

Enqueuing Transactions of Same Transaction
Type in Queue of Plurality of Queues Included in
I/O Agent Circuit
<u>910</u>

Issuing, to Transaction Pipeline, One or More
Transactions from Queue in Particular Order
<u>920</u>

Determining, at Transaction Pipeline, That
Condition Associated With Transaction of One
or More Transactions Has Been Satisfied
<u>930</u>

Based on Determining, Rejecting, From One or
More Transactions, Transaction And Up to
Threshold Number of Transactions That are
Subsequently After Transaction According to
Particular Order
<u>940</u>

*FIG. 9*

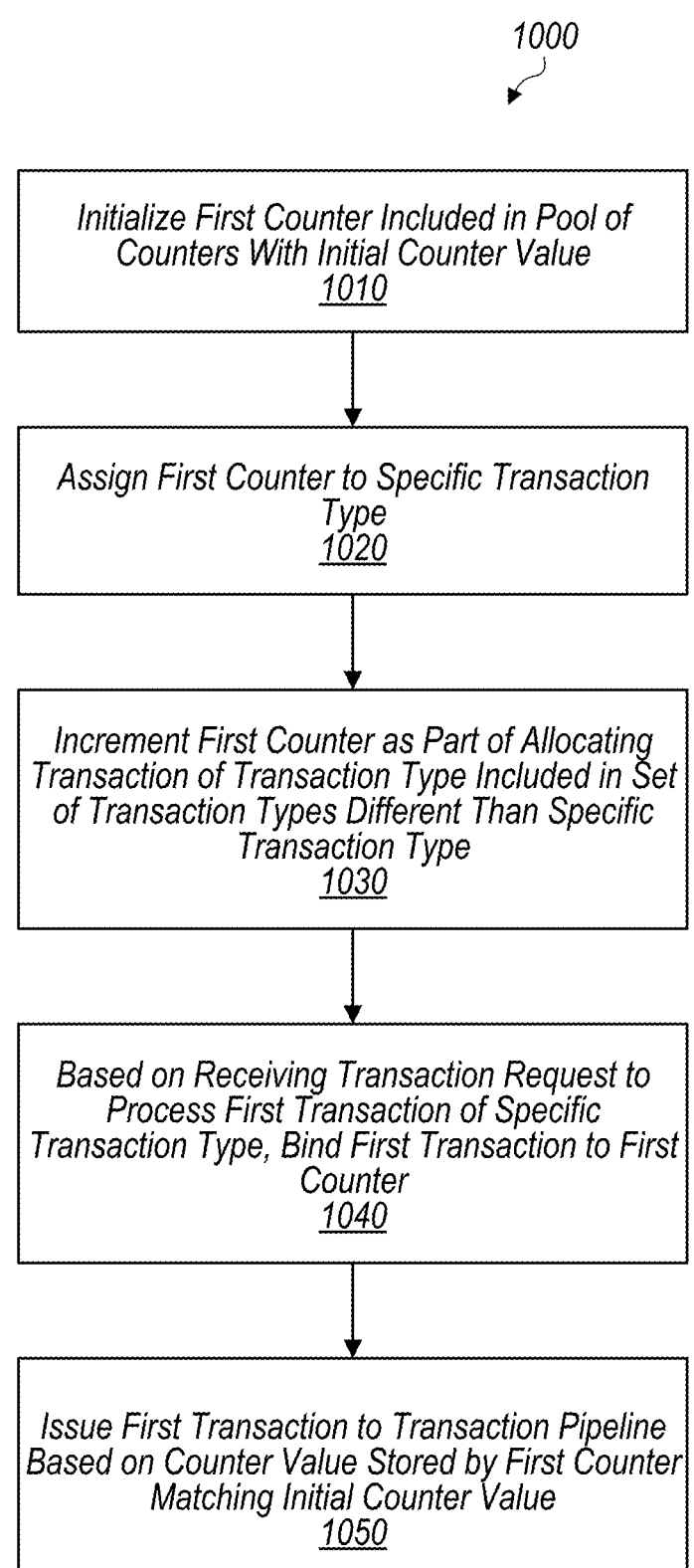

*1000*

Initialize First Counter Included in Pool of
Counters With Initial Counter Value
*1010*

Assign First Counter to Specific Transaction
Type
*1020*

Increment First Counter as Part of Allocating
Transaction of Transaction Type Included in Set
of Transaction Types Different Than Specific
Transaction Type
*1030*

Based on Receiving Transaction Request to
Process First Transaction of Specific
Transaction Type, Bind First Transaction to First
Counter
*1040*

Issue First Transaction to Transaction Pipeline
Based on Counter Value Stored by First Counter
Matching Initial Counter Value
*1050*

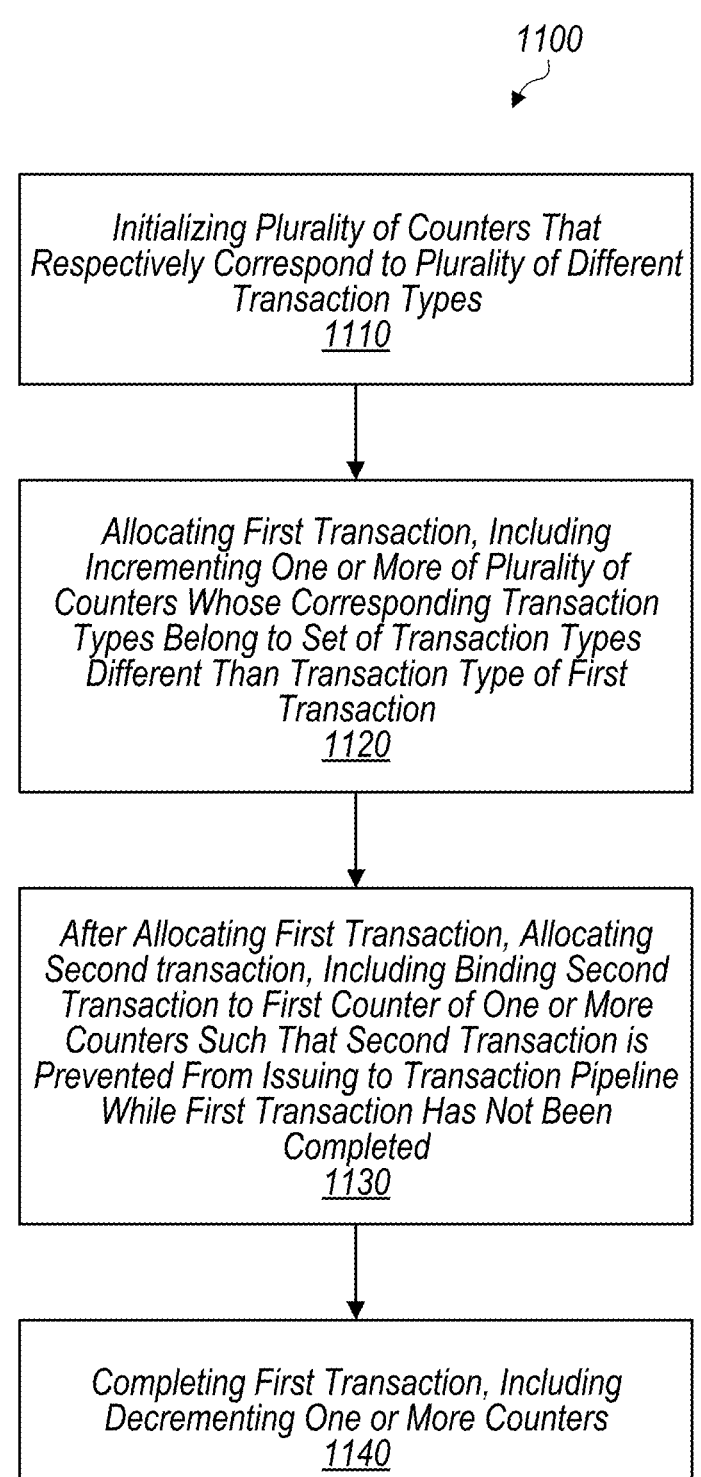

Initializing Plurality of Counters That Respectively Correspond to Plurality of Different Transaction Types
*1110*

Allocating First Transaction, Including Incrementing One or More of Plurality of Counters Whose Corresponding Transaction Types Belong to Set of Transaction Types Different Than Transaction Type of First Transaction
*1120*

After Allocating First Transaction, Allocating Second transaction, Including Binding Second Transaction to First Counter of One or More Counters Such That Second Transaction is Prevented From Issuing to Transaction Pipeline While First Transaction Has Not Been Completed
*1130*

Completing First Transaction, Including Decrementing One or More Counters
*1140*

*FIG. 11*

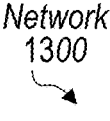
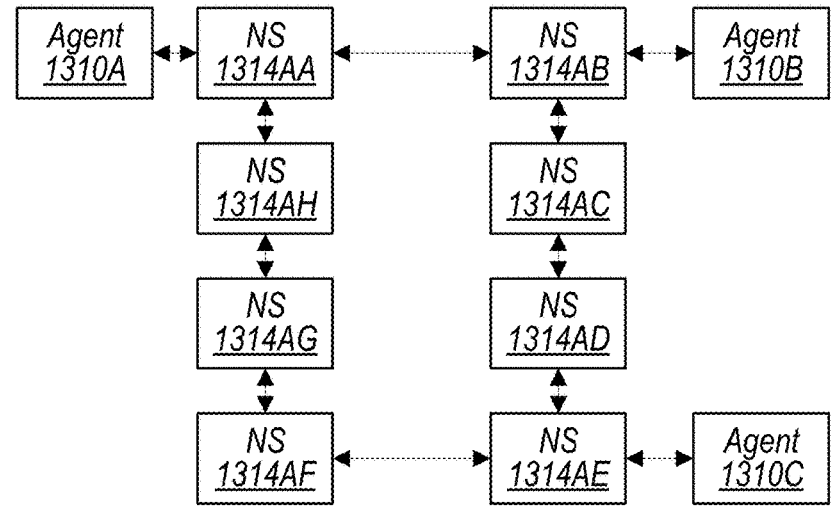
FIG. 13
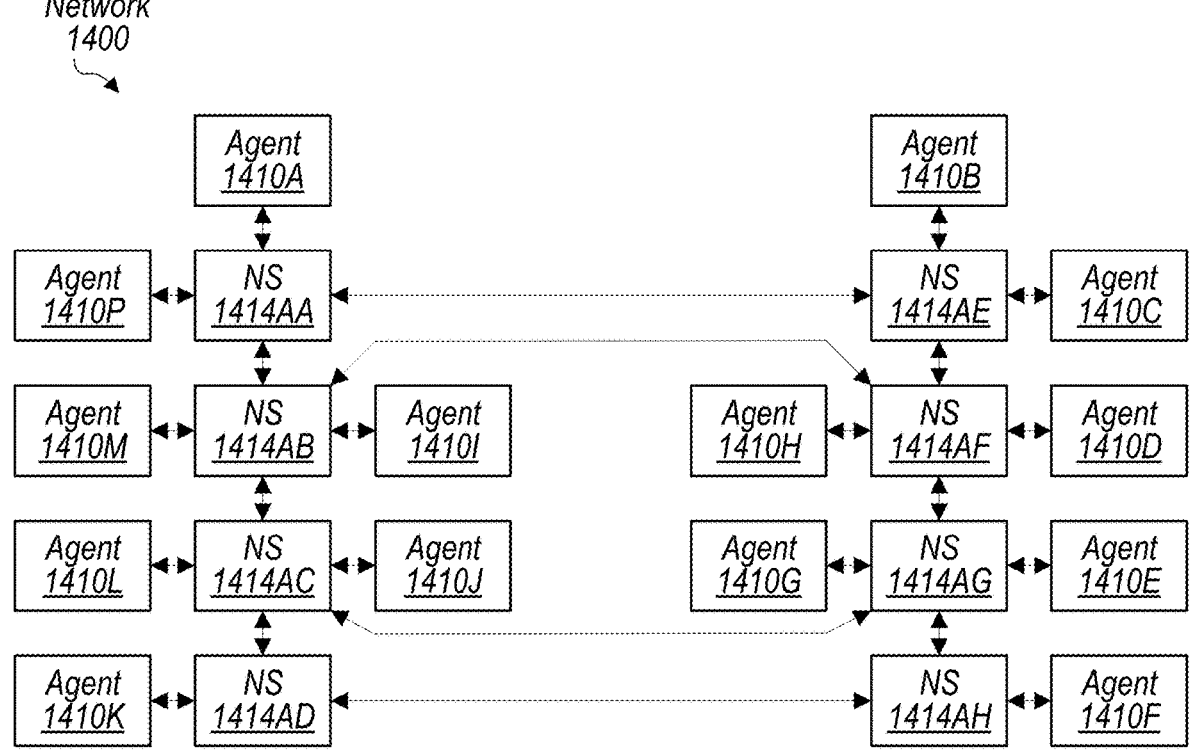
FIG. 14

1

COUNTERS FOR ENSURING TRANSACTIONAL ORDERING IN I/O AGENT

PRIORITY CLAIM

The present application claims priority to U.S. Provisional Appl. No. 63/175,877, filed Apr. 16, 2021, which is incorporated by reference herein in its entirety.

BACKGROUND

Technical Field

This disclosure relates generally to an integrated circuit and, more specifically, to the ordering and processing of transactions at an input/output (I/O) agent.

Description of the Related Art

Modern computer systems often include a system on a chip (SOC) that integrates many computer components (e.g., a central processing unit (CPU), a graphics processing unit (GPU), etc.) onto an integrated circuit die. These components are normally coupled to memory devices (e.g., random access memory) of the systems via a memory controller. During operation, those components typically perform read and write transactions that involve accessing those memory devices. For read transactions, the components retrieve data from the memory devices without manipulating the data, but for write transactions, the components manipulate the data and then ultimately write it back to one of the memory devices. Also, the components may process the transactions differently based on their transaction type (e.g., non-relaxed ordered transactions versus relaxed ordered transactions).

SUMMARY

Various embodiments relating to an I/O agent circuit that is configured to implement coherency mechanisms for processing transactions are disclosed. Generally speaking, an SOC is coupled to memory that stores data and is further coupled to and/or includes peripheral components (e.g., a display) that operate on data of that memory. An I/O agent circuit is disclosed that is included in the SOC and is configured to receive requests to perform transactions directed at cache lines of the SOC. The I/O agent circuit may store the transactions in one or more queues of the I/O agent circuit and issue, to a transaction pipeline of the I/O agent circuit from one of those queues, a transaction from a series of transactions enqueued in the queue in a particular order. The I/O agent circuit may further include a pool of counters. The I/O agent circuit may initialize a first counter included in the pool of counters with an initial counter value and assign the first counter to a specific transaction type. Thereafter, the I/O agent circuit may increment the first counter as a part of allocating a transaction of a transaction type included in a set of transaction types different than the specific transaction type. Based on receiving a transaction request to process a transaction of the specific transaction type, the I/O agent circuit may bind that transaction to the first counter. The I/O agent circuit then may issue the transaction to the transaction pipeline based on a counter value stored by the first counter matching the initial counter value. In some cases, the I/O agent circuit initializes a second counter included in the pool of counters with the initial counter value and assigns the second counter to the specific transaction type.

BRIEF DESCRIPTION OF THE DRAWINGS

FIGS. 8-9 are flow diagrams illustrating example method relating to the rejecting of one or more transactions within the I/O agent, according to some embodiments.

FIGS. 10-11 are flow diagrams illustrating example method relating to using counters to track transactions, according to some embodiments.

FIG. 13 is a block diagram illustrating example elements of a network using a ring topology, according to some embodiments.

FIG. 14 is a block diagram illustrating example elements of a network using a mesh topology, according to some embodiments.

DETAILED DESCRIPTION

Figure 1:
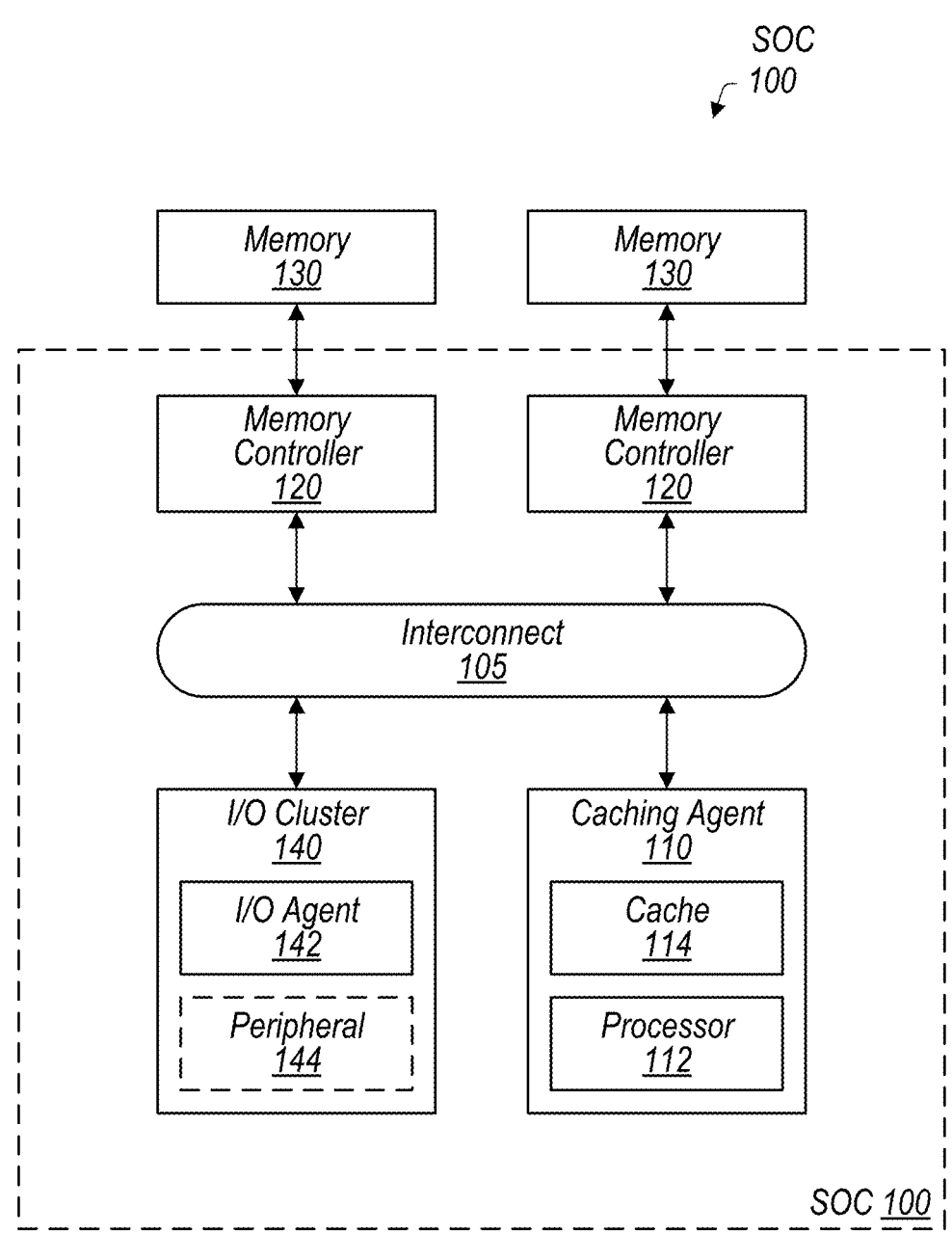
FIG. 1 is a block diagram illustrating example elements of an SOC, according to some embodiments.

This disclosure describes embodiments pertaining to an I/O agent that is configured to serve as a bridge between peripheral devices (or, simply "peripherals") and memory accessible to those peripheral devices. As part of bridging those components, the I/O agent processes different types of transactions requested by the peripherals and other components of the system that includes that I/O agent. One such transaction type may be a posted non-relaxed ordered transaction that is processed in a particular order relative to other transactions at the I/O agent. For example, a group of posted non-relaxed ordered transactions might be processed in the order in which the requests for those transactions are received at the I/O agent. As used herein, the term "posted", within the context of a transaction (e.g., a posted non-relaxed ordered transaction), is used in accordance with its well-understood meaning and refers to a transaction that does not wait for a completion response (e.g., for a data write to memory) before indicating success or failure of the transaction to a requestor of the transaction. In contrast, the term "non-posted" refers to a transaction that does wait for a completion response (e.g., that a data write to memory completed) before indicating success or failure of the transaction.

In some cases, however, transactions of a particular transaction type may have to wait for preceding transactions (according to an ordering rule or rules) of one or more other transaction types to complete or retire before those transactions of the particular type can begin to be released from a queue to a pipeline of the I/O agent. As used herein, the phrase "a preceding transaction" is used to refer to a transaction that precedes another transaction according to a defined ordering in which those transactions are to be completed. The defined ordering may correspond to, for example, the order in which requests for the transactions are received at the I/O agent, the order in which the transactions are allocated at the I/O agent, or an order specified by the requestor of the transactions. A preceding transaction can also be described as a more senior transaction relative to the transaction that it precedes. Because a transaction may have to wait for certain preceding transactions to complete, it may be desirable to track those preceding transactions (which might be of other types and stored in different queues) that have to complete or retire before the transaction can be released from its queue to a pipeline. Additionally, in some cases, one or more transactions that are ordered may be issued to a pipeline and at least one of those transactions may not be serviceable when it reaches a certain stage of the pipeline. As a result, the transaction may be returned back to its queue. It may be desirable to ensure that the ordered transactions that follow that rejected transaction are also returned to the queue such that the order is maintained. This present disclosure addresses, among other things, the technical problems that pertain to tracking those transactions that have to complete or retire before a certain transaction can be released, detecting when to reject a transaction, and ensuring that order rules are maintained when rejecting that transaction.

In various embodiments that are described below, a system on a chip (SOC) includes memory, memory controllers, and an I/O agent that is coupled to one or more peripherals. The I/O agent is configured to receive requests from those peripherals to perform transactions, store the transactions (that is, transactional information) in queues of the I/O agent, and release those transactions to a pipeline of the I/O agent. As mentioned, before a transaction may be released, other preceding transactions, which belong to a specific set of transaction types (herein referred to as the "push transaction type set"), have to be completed or retired. In various embodiments, the I/O agent is configured use counters to track, for a transaction, those preceding transactions that have to complete or retire before the transaction is released. The I/O agent may instantiate a counter in association with a transaction type (e.g., posted non-relaxed ordered transactions). The I/O agent then increments the counter when a transaction is allocated at the I/O agent that belongs to the push transaction type set (e.g., posted relaxed transactions) for that transaction type and decrements the counter when the allocated transaction is subsequently completed. When a transaction of the transaction type of the counter is allocated, at least two events may occur. First, the I/O agent may bind the counter to the transaction and only decrement the counter while the counter is bound to the transaction. Once the counter reaches its initial value (e.g., zero), the bound transaction may be issued—in some cases, the transaction is issued after it becomes the senior transaction for its queue. Second, a new instance of the counter may be instantiated and used to track any new transactions that are allocated that belong to the push transaction type set. When another transaction belonging to the transaction type of the counter is allocated, the two events may occur again. As a result, the I/O agent may maintain one active counter for the transaction type that may be incremented and decremented and one or more bound counters for the transaction type that may only be decremented.

Once a transaction is released from its queue, the transaction may enter the transaction pipeline. In various embodiments, the transaction pipeline comprises multiple pipeline stages, one of which is a decision stage in which a decision is made on whether to reject and return a transaction to its queue based on a condition being satisfied. As mentioned, for certain queues, the transactions stored in those queues have to be completed in a certain order. In some cases, multiple transactions are issued from the same queue and one of those transactions may reach the decision stage and be rejected. In order to ensure their order, the pipeline may reject one or more transactions that follow the initially rejected transaction. In various embodiments, those rejected transactions are stored in the queue such that the initially rejected transaction is stored at the head of the queue and the other transactions are stored in the appropriate order.

These techniques may be advantageous as they enable an I/O agent to be able to process transactions of different transaction types while maintaining ordering requirements associated with those transaction types. For example, the use of counters by the I/O agent enables the I/O agent to ensure that a transaction does not prematurely issue to the pipeline, potentially causing data coherency issues for the system. Moreover, by rejecting certain transactions at the pipeline at certain stages in time, the I/O agent can ensure forward progress for other transactions. For example, the I/O agent may temporarily reject a snoop transaction to permit another transaction to utilize fetched data before it is snooped away so that that other transaction can be completed. An example application of these techniques will now be discussed, starting with reference to FIG. 1.

Turning now to FIG. 1, a block diagram of an example system on a chip (SOC) 100 is depicted. As implied by the name, the various components of SOC 100 are integrated onto a single semiconductor substrate as an integrated circuit "chip." But in some embodiments, the components are implemented on two or more discrete chips within a computing system. In the illustrated embodiment, SOC 100 includes a caching agent 110, memory controllers 120A and 120B coupled to memory 130A and 130B, respectively, and an input/output (I/O) cluster 140. Components 110, 120, and 140 are coupled together via an interconnect 105. As further shown, caching agent 110 includes a processor 112 and a cache 114 while I/O cluster 140 includes an I/O agent 142 and a peripheral 144. The peripheral 144 may be internal to the SOC 100. In other cases, a peripheral 144 may be external to SOC 100, but coupled to I/O agent 142 via an interface. In various embodiments, SOC 100 is implemented differently than shown. For example, SOC 100 may include a display controller, a power management circuit, etc. and memory 130A and 130B may be included on SOC 100. As another example, I/O cluster 140 may have multiple peripherals 144. Accordingly, it is noted that the number of components of SOC 100 (and also the number of subcomponents) may vary between embodiments. As such, there may be more or fewer of each component/subcomponent than the number shown in FIG. 1.

A caching agent 110, in various embodiments, is circuitry that includes a cache for caching memory data or that may otherwise take control of cache lines and potentially update the data of those cache lines locally. Caching agents 110 may participate in a cache coherency protocol to ensure that updates to data made by one caching agent 110 are visible to the other caching agents 110 that subsequently read that data, and that updates made in a particular order by two or more caching agents 110 (as determined at an ordering point within SOC 100, such as memory controllers 120A-B) are observed in that order by all caching agents 110. Caching agents 110 can include, for example, processing units (e.g., CPUs, GPUs, etc.), fixed function circuitry, and fixed function circuitry having processor assist via an embedded processor (or processors). Since I/O agent 142 includes one or more caches, I/O agent 142 can be considered a type of caching agent 110 and thus participate in the cache coherency protocol. But I/O agent 142 is different from other caching agents 110 for at least the reason that I/O agent 142 serves as a cache-capable entity configured to cache data for other, separate entities (e.g., peripherals, such as a display, a USB-connected device, etc.) that do not have their own caches. I/O agent 142 may also cache a relatively small number of cache lines temporarily to improve peripheral memory access latency, but may proactively retire cache lines once transactions are complete.

In the illustrated embodiment, caching agent 110 is a processing unit having a processor 112 that may serve as the CPU of SOC 100. Processor 112, in various embodiments, includes any circuitry and/or microcode configured to execute instructions defined in an instruction set architecture that is implemented by that processor 112. Processor 112 may encompass one or more processor cores that are implemented on an integrated circuit with other components of SOC 100. Those individual processor cores of processor 112 may share a common last level cache (e.g., an L2 cache) while including their own respective caches (e.g., an L0 cache and/or an L1 cache) for storing data and program instructions. Processor 112 may execute the main control software of the system, such as an operating system. Generally, software executed by the CPU controls the other components of the system to realize the desired functionality of the system. Processor 112 may further execute other software, such as application programs, and therefore can be referred to as an application processor. Caching agent 110 may further include hardware configured to interface caching agent 110 to the other components of SOC 100 (e.g. an interface to interconnect 105).

Cache 114, in various embodiments, is a storage array that includes entries configured to store data or program instructions. As such, cache 114 may be a data cache, an instruction cache, or a shared instruction/data cache. Cache 114 may be an associative storage array (e.g., fully associative or set-associative, such as a 4-way set associative cache) or a direct-mapped storage array, and may have any desired storage capacity. In various embodiments, cache lines (or, "cache blocks") are the unit of allocation and deallocation within cache 114 and may be of any desired size (e.g. 32 bytes, 64 bytes, 128 bytes, etc.). During operation of caching agent 110, information may be pulled from other components of the system into cache 114 and used by the processor cores of processor 112. For example, as a processor core proceeds through an execution path, the processor core may cause program instructions to be fetched from memory 130A-B into cache 114 and then the processor core may fetch them from cache 114 and execute them. Also, during the operation of caching agent 110, information may be written from cache 114 to memory 130A-B through memory controllers 120A-B.

A memory controller 120, in various embodiments, includes circuitry that is configured to receive, from the other components of SOC 100, memory requests (e.g., load/store requests, instruction fetch requests, etc.) to perform memory operations, such as accessing data from a memory 130. Memory controllers 120 may be configured to access any type of memory 130. Memory 130 may be implemented using various, different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 100, however, is not limited to primary storage such as memory 130. Rather, SOC 100 may further include other forms of storage such as cache memory (e.g., L1 cache, L2 cache, etc.) that may be found in caching agent 110 or I/O agent 140. In various embodiments, memory controllers 120 include queues for storing and ordering memory operations that are to be presented to memory 130. Memory controllers 120 may also include data buffers to store write data awaiting to be written to memory 130 and read data awaiting to be returned to the source of a memory operation (e.g., caching agent 110).

In various embodiments, memory controllers 120 include components for maintaining cache coherency within SOC 100, including components that track the location of data of cache lines within SOC 100. As such, in various embodiments, requests for cache line data are routed through memory controllers 120, which may access the data from other caching agents 110 and/or memory 130A-B. In addition to accessing the data, memory controllers 120 may cause snoop requests to be issued to caching agents 110 and I/O agents 142 that store the data within their local cache. As a result, memory controllers 120 can cause those caching agents 110 and I/O agents 142 to invalidate and/or evict the data from their caches to ensure coherency within the system. Accordingly, in various embodiments, memory controllers 120 process exclusive cache line ownership requests in which memory controllers 120 grant a component exclusive ownership of a cache line while using snoop request to ensure that the data is not cached in other caching agents 110 and I/O agents 142.

I/O cluster 140, in various embodiments, includes one or more peripherals 144 that may provide additional hardware functionality. The I/O cluster 140 may further include I/O agent 142. Peripherals 144 may include, for example, video peripherals (e.g., GPUs, blenders, video encoder/decoders, display controllers, scalers, etc.) and audio peripherals (e.g., microphones, speakers, interfaces to microphones and speakers, digital signal processors, audio processors, mixers, etc.). Peripherals 144 may further include interface controllers for various interfaces that are external to SOC 100 (e.g., Universal Serial Bus (USB), peripheral component interconnect (PCI) and PCI Express (PCIe), serial and parallel ports, etc.) and networking peripherals, such as media access controllers (MACs). While not shown, in various embodiments, SOC 100 includes multiple I/O clusters 140 having respective sets of peripherals 144. For example, SOC 100 might include a first I/O cluster 140 having external display peripherals 144, a second I/O cluster 140 having USB peripherals 144, and a third I/O cluster 140 having video encoder peripherals 144. Each of the I/O clusters 140 may include its own I/O agent 142.

I/O agent 142, in various embodiments, includes circuitry that is configured to bridge its peripherals 144 to interconnect 105 and to implement coherency mechanisms for processing transactions associated with those peripherals 144. I/O agent 142 receives transaction requests from peripheral 144 to read and/or write data associated with memory 130A-B. Transactions (that is, transactional information associated with the requests) may be stored in ingress queues and released from those queues to a pipeline of I/O agent 142 based on one or more conditions being satisfied. Ingress queues are discussed in more detail with respect to FIGS. 2 and 4B and example conditions for releasing a transaction are discussed in more detail with respect to FIGS. 6 and 7. The pipeline processes the transactions and may reject one or more of the transactions based on one or more conditions being satisfied. The pipeline is discussed in more detail with respect to FIG. 3 and example conditions for rejecting a transaction are discussed in more detail with respect to FIGS. 5A and 5B. As part of processing a transaction, in various embodiments, I/O agent 142 may communicate with memory controllers 120 to obtain exclusive ownership over the data targeted by the transaction. As such, memory controllers 120 may grant exclusive ownership to I/O agent 142, which may involve providing I/O agent 142 with cache line data and sending snoop requests to other caching agents 110 and I/O agents 142. After obtaining exclusive ownership of the cache line data, I/O agent 142 may start completing the transactions that target the cache line data. In response to completing a transaction, I/O agent 142 may send an acknowledgement to the requesting peripheral 144 that the transaction has been completed. In some embodiments, I/O agent 142 does not obtain exclusive ownership for relaxed ordered requests, which do not have to be completed in a specified order.

Interconnect 105, in various embodiments, is any communication-based interconnect and/or protocol for communicating among components of SOC 100. For example, interconnect 105 may enable processor 112 within caching agent 110 to interact with peripheral 144 within I/O cluster 140. In various embodiments, interconnect 105 is bus-based, including shared bus configurations, cross bar configurations, and hierarchical buses with bridges. Interconnect 105 may be packet-based, and may be hierarchical with bridges, cross bar, point-to-point, or other interconnects. Example embodiments of SOC 100, including interconnects, are discussed in detail with respect to FIGS. 12-16.

Figure 2:
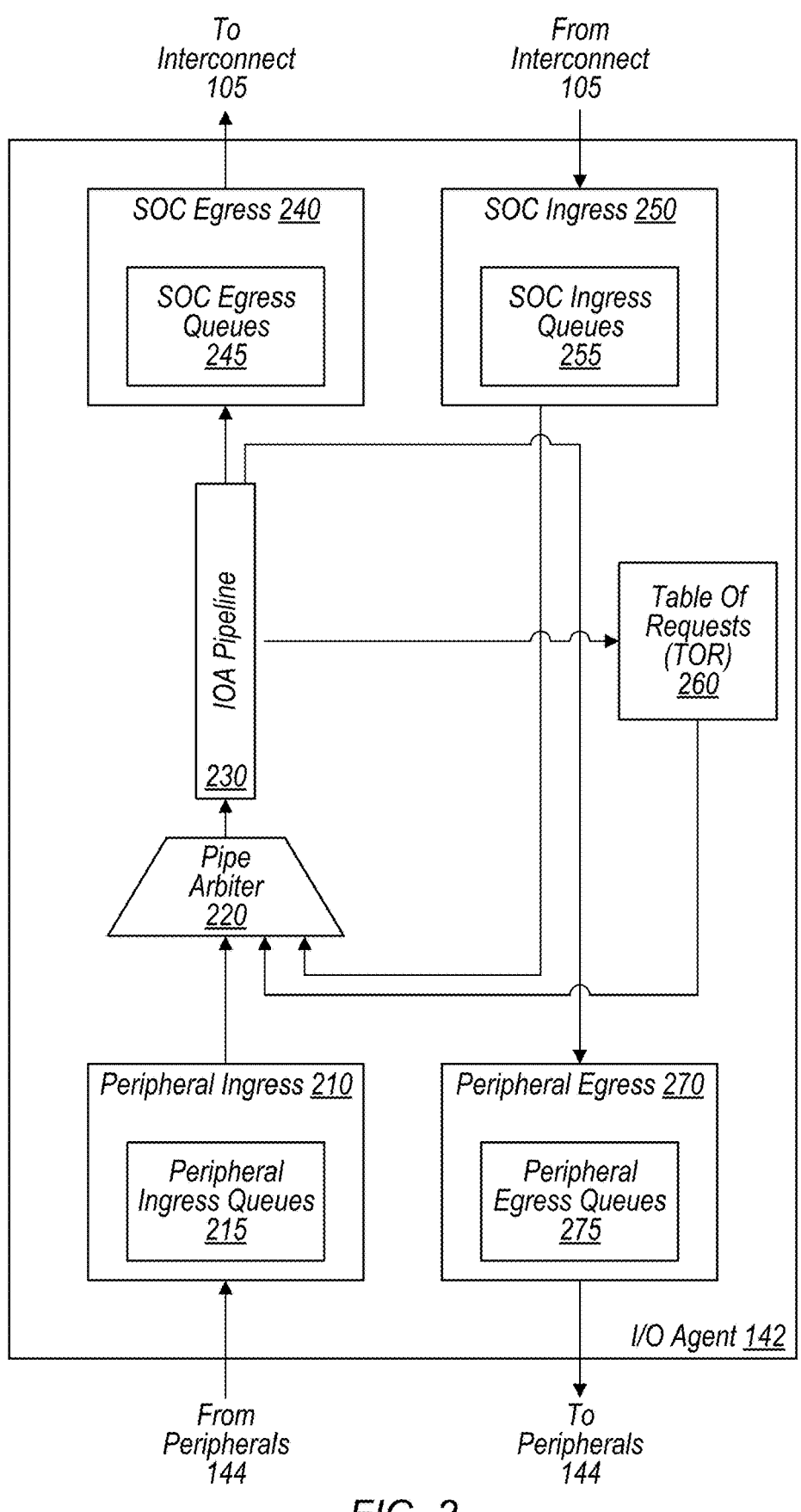
FIG. 2 is a block diagram illustrating example elements of an I/O agent, according to some embodiments.

Turning now to FIG. 2, a block diagram of example elements of I/O agent 142 is shown. In the illustrated embodiment, I/O agent 142 includes a peripheral ingress 210 (with peripheral ingress queues 215), a pipe arbiter 220, an I/O agent (IOA) pipeline 230, an SOC egress 240 (with SOC egress queues 245), an SOC ingress 250 (with SOC ingress queues 255), a table of requests/transactions (TOR) 260, and a peripheral egress 270 (with peripheral egress queues 275). As shown, pipe arbiter 220 is coupled to peripheral ingress 210, SOC ingress 250, TOR 260, and IOA pipeline 230, and IOA pipeline 230 is coupled to SOC egress 240 and peripheral egress 270. While not depicted, in various embodiments, I/O agent 142 includes caches that are configured to cache data to facilitate the processing of transactions at I/O agent 142. In some embodiments, I/O agent 142 is implemented differently than shown. As an example, I/O agent 142 may not include TOR 260.

Peripheral ingress 210, in various embodiments, is circuitry coupled to peripherals 144 and configured to receive transactions requests from peripherals 144 to read and write data on their behalf. Consequently, peripheral ingress 210 may receive read transaction requests, write transaction requests, or combination of read and write transaction requests from a peripheral 144. A transaction request, in various embodiments, is a message that initiates a transaction, and specifies a memory address and a size of the data be read or written. For a write transaction, the transaction request may further specify data to be written to the cache line. Peripheral ingress 210 may store transactional information (e.g., information that identifies the targeted cache line, the data to be written if applicable, etc.) from a transaction request in a peripheral ingress queue 215 as a transaction. Peripheral ingress 210 may submit transactions from peripheral ingress queues 215 to pipe arbiter 220.

Peripheral ingress queues 215, in various embodiments, are circuitry that is configured to store transactional information derived from transaction requests received from peripherals 144. Peripheral ingress queues 215 may each comprise a linked list structure that implements a first-in, first-out protocol that preserves an ordering of transactions within a queue. In some embodiments, there are one or more peripheral ingress queues 215 that each comprise multiple linked list structures that store transactions. In various embodiments, a linked list structure of a peripheral ingress queue 215 is used to store transactions belonging to one or more specific transaction types. The transaction types may include, for example, posted relaxed ordered, posted non-relaxed ordered, non-posted relaxed ordered DRAM, and non-posted non-relaxed ordered DRAM. Accordingly, for example, a first linked list structure may be used to store posted relaxed ordered and posted non-relaxed ordered transactions while a second linked list structure is used for storing non-posted relaxed ordered DRAM and non-posted non-relaxed ordered DRAM transactions. In some instances, since a linked list structure may store relaxed and non-relaxed ordered transactions, the relaxed ordered transactions may not bypass the non-relaxed ordered transactions inside a peripheral ingress queue 215.

In various embodiments, I/O agent 142 supports different virtual channels for servicing transactions. I/O agent 142 may support a low latency virtual channel for transactions that have low processing latencies and a bulk virtual channel for transactions that are directed at the same cache line/block, although potentially different portions of the cache line. Accordingly, in some embodiments, a peripheral ingress queue 215 may correspond to a specific virtual channel and thus be used to store corresponding transactions. For example, a peripheral ingress queue 215 may be used to store transactions classified as bulk non-posted relaxed ordered while another peripheral ingress queue 215 is used to store transactions classified as low latency non-posted relaxed ordered. In some embodiments, the linked list structures correspond to different virtual channels and thus a peripheral ingress queue 215 with multiple linked list structures can correspond to different virtual channels.

Pipe arbiter 220, in various embodiments, is circuitry configured to select a transaction from a set of transactions provided to pipe arbiter 220 and issue the selected transaction to IOA pipeline 230. The selected transaction is referred to herein as the winning transaction as it has won the arbitration. As shown, pipe arbiter 220 can receive transactions from peripheral ingress 210, SOC ingress 250, and TOR 260. In some embodiments, the winning transaction is selected based on a credit scheme in which credits are used by peripheral ingress 210, SOC ingress 250, and TOR 260 to win arbitration. A spent credit may be returned to the spender in response to the associated transaction completing a pass through IOA pipeline 230. In some embodiments, peripheral ingress 210, SOC ingress 250, and TOR 260 are assigned traffic priority levels. As such, when receiving transactions from those sources, pipe arbiter 220 may select a transaction from the source with the highest priority. Consequently, traffic from a source may not be sent to IOA pipeline 230 if traffic from a higher priority source is also available at pipe arbiter 220 in the same clock cycle.

IOA pipeline 230, in various embodiments, is circuitry that comprises multiple pipeline stages in which a transaction is processed. A transaction may be issued multiple times to IOA pipeline 230 such that the transaction makes multiple passes through the pipeline. On the first pipeline pass, the transaction may be allocated such that it is added to an ingress queue of TOR 260 and its write data stored in a cache of TOR 260 if it is a write transaction. In various cases, a request may be sent to a memory controller 120 for data that is targeted by the transaction as part of the first pipeline pass. After receiving a data fill response from that memory controller 120, the transaction may be issued to IOA pipeline 230 for a second pipeline pass in which the data is acted upon, the transaction is retired, and a completion message is issued to the original requester (e.g., a peripheral 144) if the request is non-posted. In some cases, a transaction may make more than two pipeline passes through IOA pipeline 230. For example, the data fill from a memory controller 120 may be snooped before a transaction is able to use the data. As such, on the second pipeline pass, a non-coherent request may be sent to the memory controller 120 to write the new data of the transaction or to request the data that is targeted by the transaction. The transaction is returned to the head of its ingress queue in TOR 260. After a completion is received from the memory controller 120, the transaction may be issued to IOA pipeline 230 for a third pipeline pass in which it is retired and a completion is sent to the original requester if the request is non-posted. The stages of IOA pipeline 230 are discussed in greater detail with respect to FIG. 3.

SOC egress 240, in various embodiments, is circuitry coupled to interconnect 105 and configured to receive commands from IOA pipeline 230 and issue requests to components of SOC 100 (e.g., a memory controller 120) based on the commands. Similar to peripheral ingress 210, SOC egress 240 includes SOC egress queues 245 that are configured to store transactional information for different types of transactions. Consequently, SOC egress queues 245 may comprise linked list structures that implement the first-in, first-out protocol that preserves the ordering of transactions within the same queue, like those of peripheral ingress queues 215. As mentioned, I/O agent 142 may issue requests to memory controllers 120 to write data or request data from a memory 130 or another component (e.g., caching agent 110) of SOC 100. When a decision is made at IOA pipeline 230 to issue such a request, IOA pipeline 230 communicates with SOC egress 240 to enqueue the request within an SOC egress queue 245. If the request is a write request, then the data of the write request may be stored at SOC egress 240. Based on SOC egress queues 245, in various embodiments, SOC egress 240 issues requests (e.g., a write request) to components of SOC 100 via interconnect 105. If the request is a write request, then the data of the write request may be sent with the write request.

SOC ingress 250, in various embodiments, is circuitry coupled to interconnect 105 and configured to receive transaction requests and responses from components of SOC 100—those responses corresponding to requests previously sent by SOC egress 240. Similar to peripheral ingress 210 and SOC egress 240, SOC ingress 250 includes SOC ingress queues 255 that are configured to store transactional information for different types of transactions. SOC ingress queues 255 may comprise linked list structures, like those of peripheral ingress queues 215 and SOC egress queues 245. After receiving a transaction request and enqueuing a transaction in a SOC ingress queue 255, in various embodiments, SOC ingress 250 may issue that transaction to IOA pipeline 230. For example, SOC ingress 250 may receive a snoop request and submit a corresponding snoop transaction to IOA pipeline 230. A "snoop" or "snoop request," as used herein, refers to a message that is transmitted to a component (e.g., I/O agent 142) to request a state change for a cache line (e.g., to invalidate data of the cache line stored within a cache of the component) and, if that component has an exclusive copy of the cache line or is otherwise responsible for the cache line, the message may also request that the data of that cache line be provided by the component. After receiving a response to a request previously issued by SOC egress 240, in various embodiments, SOC ingress 250 makes available the data of the response (if any) to components of I/O agent 142. For example, SOC ingress 250 may store the data in a cache and update TOR 260 to indicate that the corresponding transaction may be released to I/O pipeline 230 to use the data. If the response includes a completion acknowledgement, then in various embodiments, SOC ingress 250 forwards the acknowledgement to peripheral egress 270.

TOR 260, in various embodiments, is circuitry that is configured to store outstanding transactions, monitor the conditions for resending those transactions to IOA pipeline 230, and send the transactions to pipe arbiter 220 based on the conditions being satisfied. As mentioned, when a transaction makes a first pass through IOA pipeline 230 after being issued from either peripheral ingress 210 or SOC ingress 250, the transaction is allocated at TOR 260, including being stored in an ingress queue of TOR 260. As discussed in more detail with respect to FIGS. 4A-B, TOR 260 maintains various pieces of transactional information that allow for it to assess when to release a transaction to IOA pipeline 230. In some embodiments, on a pipeline pass, IOA pipeline 230 identifies if an additional pipeline pass is needed to complete a transaction. If an additional pipeline pass is needed, IOA pipeline 230 may enqueue the transaction into a TOR ingress queue and update the entry with which events that make the transaction eligible to be send to pipe arbiter 220. Once those conditions/events are satisfied, TOR 260 may issue the corresponding transaction to pipe arbiter 220 for another pipeline pass through IOA pipeline 230.

Peripheral egress 270, in various embodiments, is circuitry coupled to peripherals 144 and configured to provide responses to peripherals 144 for requests that were previously sent by peripherals 144. Similar to peripheral ingress 210, peripheral egress 270 includes peripheral egress queues 275 that are configured to store transactional information for different types of transactions. Peripheral egress queues 275 may also comprise linked list structures, like those of peripheral ingress queues 215. As part of a final pipeline pass for a transaction, IOA pipeline 230 may store, in peripheral egress queues 275, the completion acknowledgements received at SOC ingress 250 along with any data if applicable. In some cases, SOC ingress 250 forwards the completion acknowledgements and data to peripheral egress 270. In various embodiments, after a transaction reaches the head of its queue in peripheral egress 270, peripheral egress 270 provides the completion acknowledgment and data (if applicable) to the appropriate peripheral 144.

Figure 3:
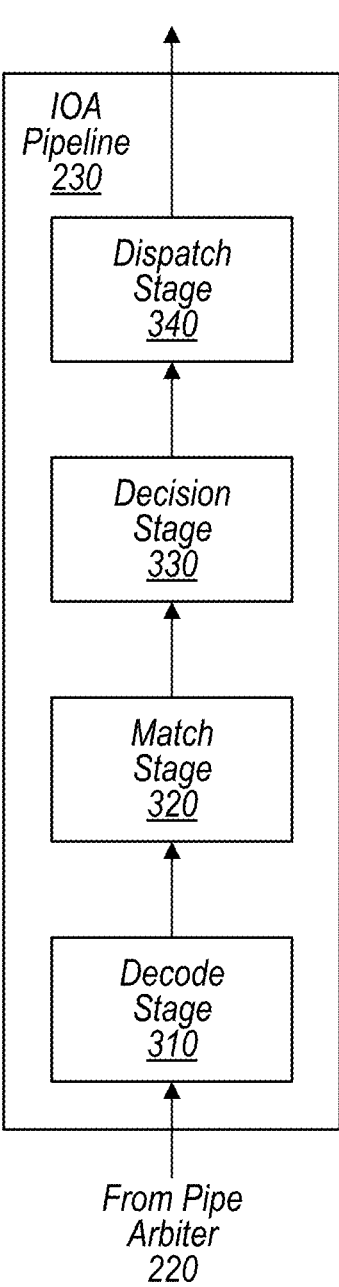
FIG. 3 is a block diagram illustrating example elements of a transaction pipeline of the I/O agent, according to some embodiments.

Turning now to FIG. 3, a block diagram of example pipeline stages of IOA pipeline 230 is shown. In the illustrated embodiment, IOA pipeline 230 includes a decode stage 310, a match stage 320, a decision stage 330, and a dispatch stage 340. In some embodiments, IOA pipeline 230 is implemented differently than shown—e.g., IOA pipeline 230 may include more or less pipeline stages. Furthermore, the action(s) performed at a particular stage in one embodiment may be performed at another stage in another embodiment.

Decode stage 310, in various embodiments, is a pipeline stage in which attributes of a transaction are accessed and/or stored. As explained, a transaction may make multiple pipeline passes. On the first pipeline pass, in various embodiments, the transaction is decoded at decode stage 310 into a set of attributes and those attributes are then stored at TOR 260. On subsequent pipeline passes, those attributes are accessed from TOR 260 at decode stage 310. The attributes of a transaction may include, for example, a command, a transaction type, a virtual channel, a source, and/or a destination. The command attribute may identify the action(s) to be performed for the transaction—e.g., send a read request to a memory controller 120, send a write request, send a completion acknowledgement, invalidate the data of a cache line for a snoop, etc. The transaction type attribute may identify the type of the transaction (e.g., non-posted non-relaxed ordered) and the virtual channel attribute may identify the virtual channel (e.g., low latency or bulk). The source attribute may identify the originator of a transaction and the destination may a target for sending data (e.g., the originator of a snoop request). There may be other attributes, such as an address attribute that identifies the address targeted by a transaction.

Match stage 320, in various embodiments, is a pipeline stage in which an address match is performed involving an incoming transaction and older outstanding transactions. At match stage 320, in various embodiments, IOA pipeline 230 determines, based on information stored at TOR 260, whether the incoming transaction targets an address targeted by older outstanding transactions. If there is a match, then IOA pipeline 230 may determine that the data associated with that address has already been (or is in the processing of being) fetched and stored within a cache of I/O agent 142. Thus, a request for data may not need to be sent for the transaction—this address match assessment may be performed on the first pipeline pass. IOA pipeline 230 may also determine if there are any hazard conditions involving the incoming transaction and older outstanding transactions. In various embodiments, at match stage 320, IOA pipeline 230 binds the incoming transaction to a counter and allocates another counter for the transaction type of the incoming transaction. Counters are discussed in more detail with respect to FIGS. 4A, 6, and 7.

Decision stage 330, in various embodiments, is a pipeline stage in which a decision is made on whether to accept or reject a transaction. In some instances, a transaction may not be serviceable and thus should be rejected. For example, a snoop transaction may not be serviceable if the data being snooped has not been received at I/O agent 142 and thus the snoop transaction should be rejected so that it can be retried at a later time. Accordingly, in various embodiments, at decision stage 330, IOA pipeline 230 determines whether one or more rejection conditions (e.g., whether the data is available) associated with a transaction (e.g., a snoop transaction) are satisfied (e.g., the data is not yet available). IOA pipeline 230 may determine whether the one or more rejection conditions are satisfied based on the attribute information stored in TOR 260, such as a directory state value that indicates the state of a cache line (e.g., filled, snooped, etc.) targeted by a transaction. Based on a decision to reject a transaction, IOA pipeline 230 returns the transaction back to the head of its ingress queue for retry at a later time. Transactions from the same queue that follow the rejected transaction may also be rejected at decision stage 330 and returned to the queue in order to maintain the ordering of those transactions.

Dispatch stage 340, in various embodiments, is a pipeline stage in which one or more actions are performed as part of carrying out the decision of decision stage 330. In response to a transaction being accepted at decision stage 330, IOA pipeline 230 may dispatch requests to SOC egress 240 to fetch data for the corresponding transactions or IOA pipeline 230 may retire a transaction such that the effects of the transaction are visible to the components of SOC 100. As part of a retirement, IOA pipeline 230 may cause data to be written to a memory 130 and/or completion/retirement acknowledgements to be provided to TOR 260 and a peripheral 144 via peripheral egress 270. IOA pipeline 230 may further determine whether a transaction should make another pipeline pass and if so, may enqueue the transaction in an ingress queue of TOR 260. In response to a transaction being rejected at decision stage 330, IOA pipeline 230 may dispatch the transaction and a rejection acknowledgement to the transaction's ingress so that the ingress may add the transaction back to its queue in the appropriate position within the queue for maintaining the correct ordering. In various embodiments, IOA pipeline 230 updates the transaction information stored at TOR 260 for a transaction. This may include updating the status of the transaction (e.g., retired), identifying the conditions for releasing the transaction if it has not retired, binding the transaction to a counter, decrementing one or more counters associated with the transaction in response to it completing, incrementing one or more counters associated with the transaction as part of allocating the transaction, etc.

Figure 4A:
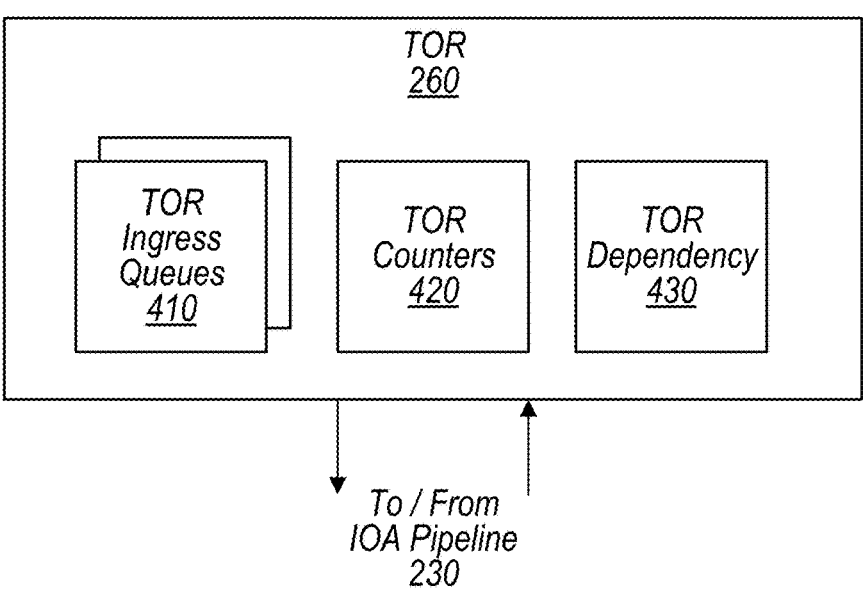
FIG. 4A is a block diagram illustrating example elements of a table of requests (TOR) of the I/O agent, according to some embodiments.

Turning now to FIG. 4A, a block diagram of example elements of TOR 260 is shown. In the illustrated embodiment, TOR 260 includes TOR ingress queues 410, TOR counters 420, and a TOR dependency block 430. In some embodiments, TOR 260 is implemented differently than shown. For example, TOR 260 may include an address block that is configured to store addresses associated with outstanding transactions, which can be used in address comparisons that are performed at match stage 320 of IOA pipeline 230.

TOR ingress queues 410, in various embodiments, are circuitry configured to store the outstanding transactions that require subsequent passes through IOA pipeline 230. Similar to the peripheral ingress queues of peripheral ingress 210, TOR ingress queues 410 are configured to store transactional information for different types of transactions. TOR ingress queues 410 may comprise linked list structures that implement the first-in, first-out protocol that preserves the ordering of transactions within the same queue, like those of peripheral ingress queues 215. As explained, IOA pipeline 230 may determine that a transaction should make another pipeline pass and thus may enqueue the transaction in a TOR ingress queue 410. IOA pipeline 230 may also provide information identifying the conditions for releasing that transaction. Accordingly, TOR 260, in various embodiments, monitors for external and internal trigger events that cause the transaction to be eligible for arbitration. If the transaction is deemed eligible, TOR 260 may send the transaction to arbiter 220 in FIFO order per the transaction's TOR ingress queue 410. In many cases, a transaction may be eligible when it is the senior transaction for its queue and its bound TOR counter 420 reaches a certain value (e.g., zero).

A TOR counter 420, in various embodiments, corresponds to an entry within a table of counter values maintained by TOR 260. Accordingly, TOR 260 may instantiate a TOR counter 420 by allocating, in that table, an entry that includes an initial counter value (e.g., zero). TOR 260 may update the entry with a new value to increment or decrement that TOR counter 420. TOR 260 may further assign the counter to a transaction type (e.g., by storing an identifier of a transaction type in the entry). In some embodiments, however, a TOR counter 420 is circuitry configured to store and modify a value. In various embodiments, a TOR counter 420 is allocated and assigned a specific transaction type (referred to herein as the counter's type) and is used track transactions that have a transaction type belonging to the push transaction type set that maps to the specific transaction type. Consider an example in which a posted non-relaxed transaction has to wait for preceding posted relaxed DRAM transactions to complete before it can be released. A TOR counter 420 may be allocated in association with the posted non-relaxed transaction type and used to track preceding posted relaxed DRAM transactions.

In particular, the ordering rules may be such that transactions have to wait for preceding transactions of the same type and of different types to complete before the waiting transactions can be released to IOA pipeline 230 without causing coherency issues. As explained, in various embodiments, transactions of the same type are stored in the same ingress queue using a linked list structure. The linked list structure enforces an ordering upon transactions such that an older transaction is released prior to a younger transaction. Thus, the linked list structure may ensure that a transaction waits for older, preceding transactions of its own type to complete before it completes. To ensure, however, that a transaction waits for older, preceding transactions of the different transaction types (the push transaction type set) that are relevant to the transaction to complete, a TOR counter 420 is used. As discussed in greater detail with respect to FIGS. 6 and 7, a TOR counter 420 is incremented upon allocation of transactions of the push transaction type set and bound to a transaction of the counter's type such that the transaction is prevented from issuing to IOA pipeline 230 while those other transaction have not been completed.

TOR dependency 430, in various embodiments, is circuitry configured to maintain the ordering rules between transactions. Accordingly, TOR dependency 430 may determine when a transaction can be released from its queue to IOA pipeline 230 and may utilize TOR counters 420 to generate that determination. In various embodiments, TOR dependency 430 is responsible for incrementing and decrementing TOR counters 420. When a transaction is allocated, TOR dependency 430 may increment one or more counters based on the type of that transaction and may store, for the transaction, pointers to those counters. Accordingly, when the transaction is completed, TOR dependency 430 may decrement the counters indicated by the pointers stored for the transaction. In various embodiments, TOR dependency 430 is also configured to bind (e.g., by storing a pointer) a transaction to a TOR counter 420 whose counter type is the same as that transaction. Accordingly, when the TOR counter 420 reaches its initial value (e.g., zero), TOR dependency 430 may determine that the preceding transaction(s) of the counter's push transaction type set have been completed and thus the bound transaction may be issued to pipe arbiter 220. An example is discussed with respect to FIG. 6.

Figure 4B:
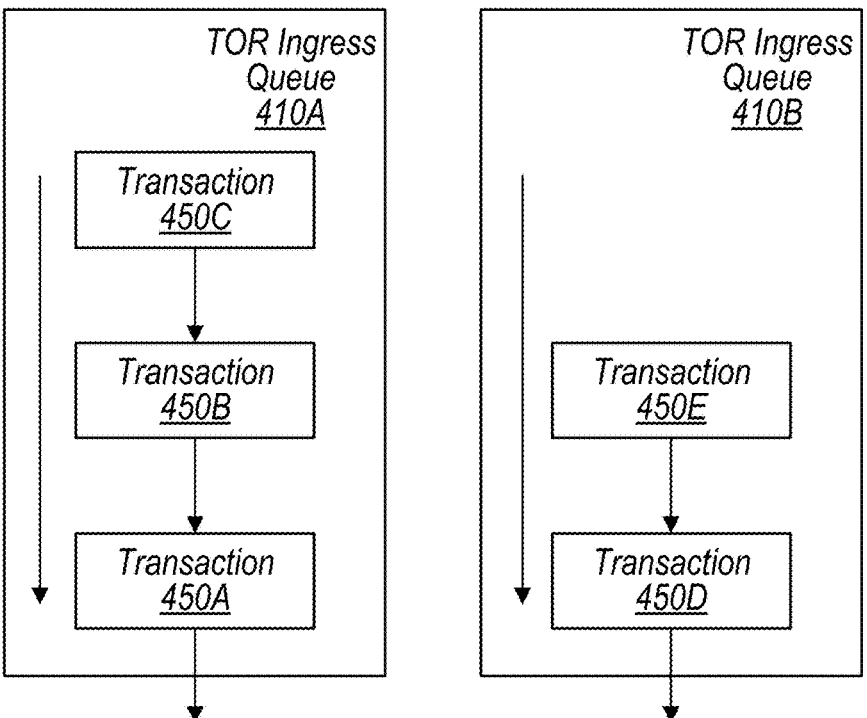
FIG. 4B is a block diagram illustrating example elements of ingress queues of the TOR, according to some embodiments.

Turning now to FIG. 4B, a block diagram of two example TOR ingress queues 410A-B is shown. In the illustrated embodiment, TOR ingress queue 410A stores transactions 450A-C, with transaction 450A being at the head of TOR ingress queue 410A (as indicated by the directions of the arrows). Also as shown, ingress queue 410B stores transactions 450D-E, with transaction 450D being at the head of TOR ingress queue 410B. In some embodiments, TOR ingress queues 410A-B are a single ingress queue that includes two linked list structures: one for stores transactions 450A-C and one for transactions 450D-E. As mentioned, a TOR ingress queue 410 may correspond to a virtual channel and store a particular type of transaction. Thus, transactions 450A-C may be of the same type, but different than the type of transactions 450E-D. As an example, transactions 450A-C may be bulk posted non-relaxed DRAM transactions while transactions 450E-D are bulk non-posed non-relaxed DRAM transactions. Furthermore, when releasing transactions 450 from a TOR ingress queue 410, those transactions are released in the order enforced by the linked list structure. As such, transaction 450A is released prior to transaction 450B, which is released prior to transaction 450C.

Figure 5A:
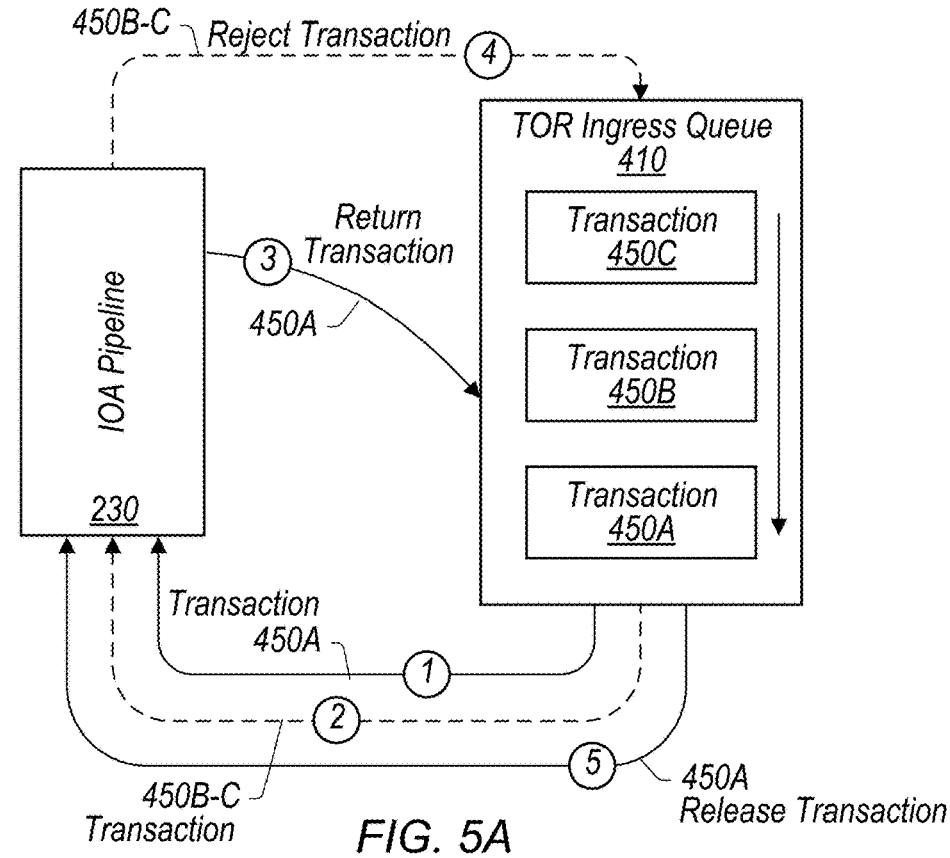
FIG. 5A is a block diagram illustrating example elements of a process for rejecting one or more transactions, according to some embodiments.

Turning now to FIG. 5A, a block diagram of example elements of a process that involves rejecting one or more transactions 450 is shown. In the illustrated embodiment, there is IOA pipeline 230 and a TOR ingress queue 410 that stores transactions 450A-C. During operation of I/O agent 142, initially transaction 450A is released to IOA pipeline 230 followed by one or both of transactions 450B-C as shown. When transaction 450A reaches decision stage 330 of IOA pipeline 230, IOA pipeline 230 determines to return transaction 450A to its TOR ingress queue 410. The decision may be based on one or more conditions being satisfied. For example, a snoop transaction may snoop data pertinent to transaction 450A before transaction 450A is able to use that data. Consequently, IOA pipeline 230 may issue again a request to a memory controller 120 for the data and return transaction 450A to its TOR ingress queue 410 so that it can make another pipeline pass once the data is available.

In order to maintain the ordering of transactions 450A-C, IOA pipeline 230 rejects one or both of transactions 450B-C—both may be rejected if both issued before transaction 450A was returned to TOR ingress queues 410. In various embodiments, the number of transactions 450 that are rejected is based on a number of clock cycles involved in re-enqueuing the initially rejected transaction in its ingress queue. For example, it may take seven clock cycles to return transaction 450A to its TOR ingress queue 410 and as such, IOA pipeline 230 can reject up to seven transactions 450 that issued from the same ingress queue 410 after transaction 450A but prior to transaction 450A being returned to that ingress queue 410. Transactions 450 associated with the other linked list structures of TOR ingress queue(s) 410 may not be rejected as a result of transaction 450A being rejected.

Figure 5B:
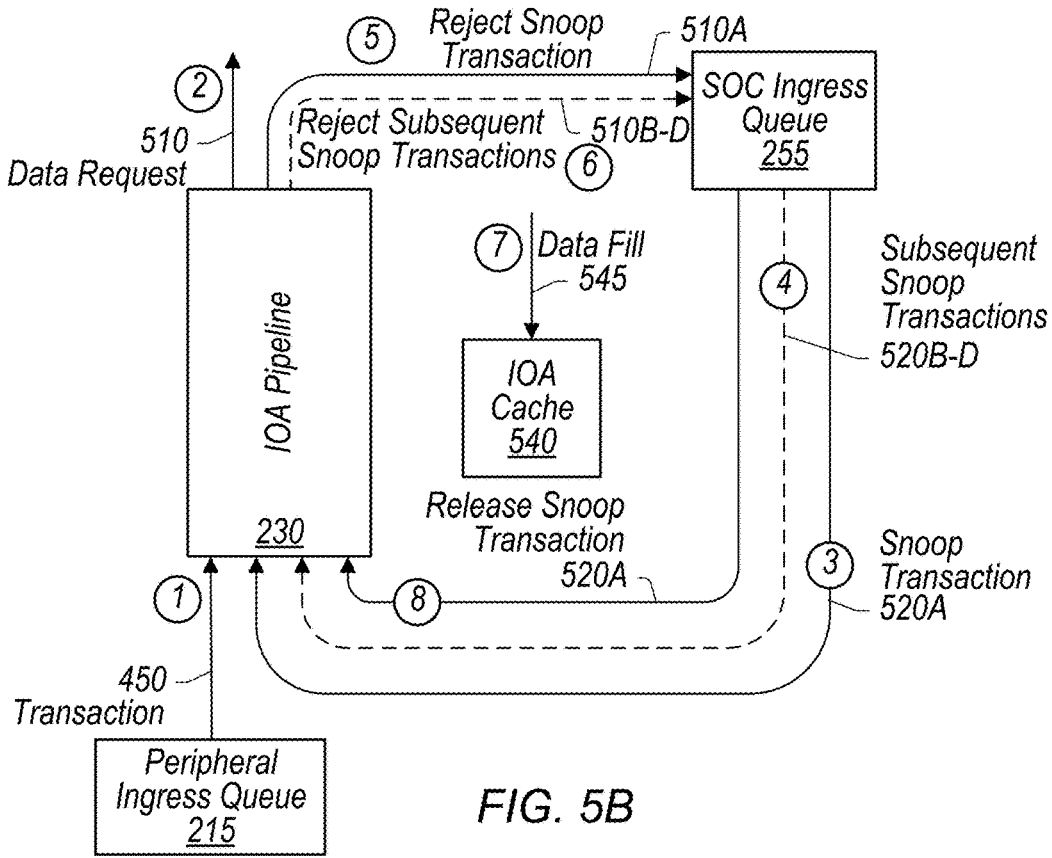
FIG. 5B is a block diagram illustrating example elements of a process for rejecting one or more snoop transactions, according to some embodiments.

Turning now to FIG. 5B, a block diagram of example elements of a process that involves rejecting one or more snoop transactions 520 is shown. In the illustrated embodiment, there is a peripheral ingress queue 215, IOA pipeline 230, an SOC ingress queue 255, and IOA cache 540. During operation of I/O agent 142, initially a transaction 450 is released to IOA pipeline 230 from peripheral ingress queue 215. When that transaction 450 reaches dispatch stage 340 of IOA pipeline 230, IOA pipeline 230 issues a data request 510 to fill a cache line targeted by the transaction 450 with data. Before the data arrives, a snoop transaction 520A is released to IOA pipeline 230 from SOC ingress queue 255 followed by snoop transactions 520B-D as shown. In some cases, one or more of snoop transactions 520A-D may have been issued to I/O agent 142 as a result of requests by caching agents 110 for certain data. When snoop transaction 520A reaches decision stage 330 of IOA pipeline 230, IOA pipeline 230 determines to return snoop transaction 520A to its SOC ingress queue 255. The decision may be based on certain conditions being satisfied. As an example, snoop transaction 520A may target the same cache line as transaction 450, but the data requested for that cache line may not yet be available. As a result, snoop transaction 520A cannot be serviced and thus IOA pipeline 230 returns snoop transaction 520A to its SOC ingress queue 255 until the data fill occurs. As another example, snoop transaction 520A may target a cache line that is targeted by a transaction 450 that has become the senior transaction 450 of its SOC ingress queue 255 (that is, it has become the senior transaction 450 of its linked list structure within SOC ingress queue 255 as SOC ingress queue 255 may include multiple linked list structures). Accordingly, in order to ensure forward progress of the transactions 450 of that linked list structure, in various embodiments, IOA pipeline 230 rejects snoop transaction 520A back to its SOC ingress queue 255 so that the senior transaction 450 may use the cache data instead of it being snooped away, which would force IOA pipeline 230 to issue another data request 510. If, however, a transaction 450 is not a senior transaction, then IOA pipeline 230 may permit a snoop transaction 520 to snoop the targeted data.

To maintain the ordering of snoop transactions 520A-D, IOA pipeline 230 rejects the remaining snoop transactions 520B-D as shown. IOA pipeline 230 may also update SOC ingress 250 to store state information for snoop transaction 520A that indicates a trigger event for releasing snoop transaction 520A from its SOC ingress queue 255. The trigger event may be a data fill. After snoop transactions 520A-D have been re-enqueued, SOC ingress 250 may cease issuing snoop transactions from that queue until at least a determination is made that the trigger event has occurred. As shown, a data fill 545 arrives at I/O agent 142 and fills IOA cache 540. IOA cache 540, in various embodiments, is a cache used to store data received from peripherals 144 and other components of SOC 100 (e.g., a memory controller 120). After the data fill 545 has occurred, snoop transaction 540A is released to IOA pipeline 230 as shown. Snoop transaction 540A may then snoop the targeted data.

Figure 6:
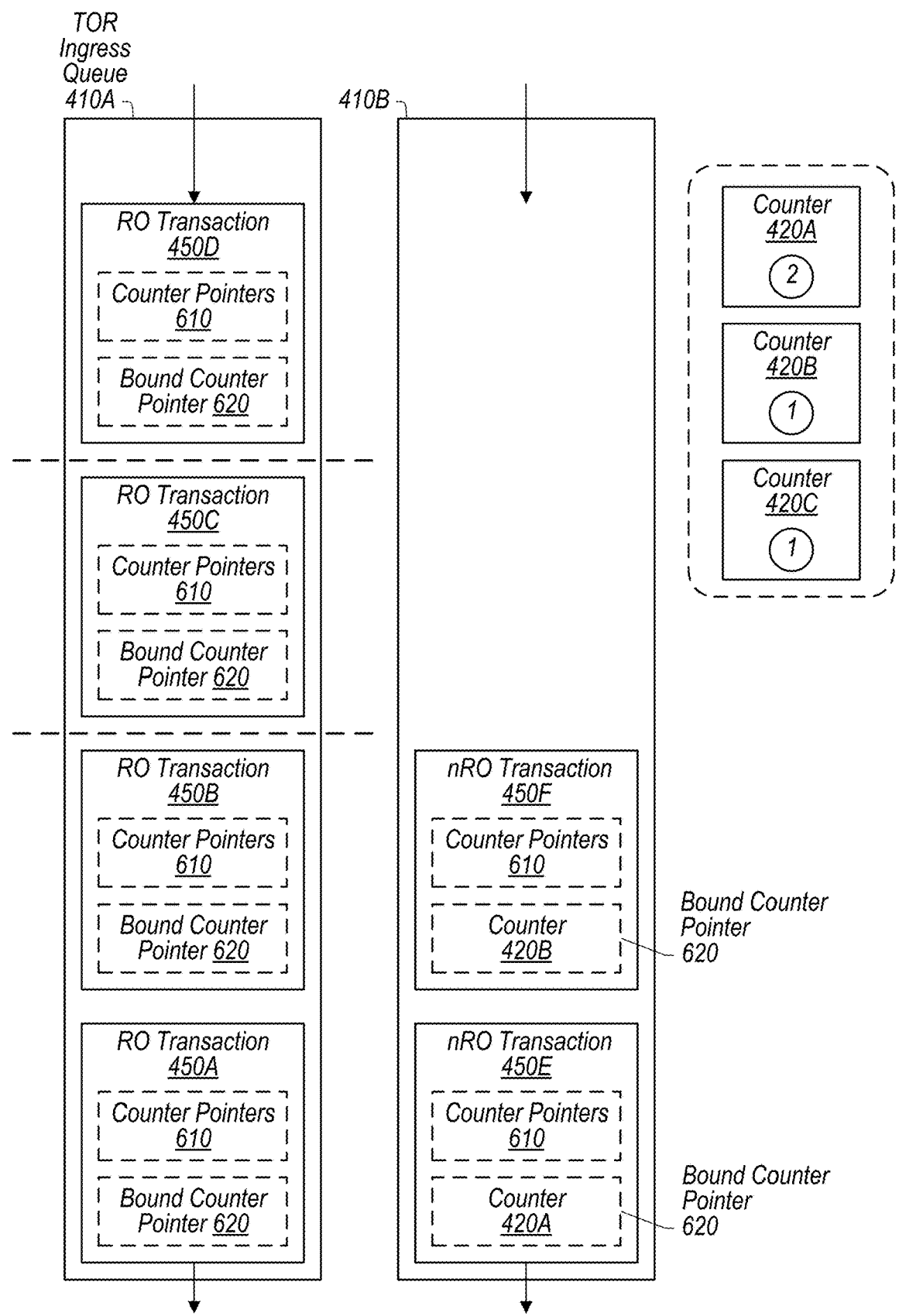
FIG. 6 is a block diagram illustrating example of using counters to track transactions, according to some embodiments.

Turning now to FIG. 6, a block diagram of example elements of a process that involves using counters 420 to track transactions 450 is shown. In the illustrated embodiment, there are TOR ingress queues 410A-B and counters 420A-C. As depicted, TOR ingress queue 410A is used to store relaxed ordered (RO) transactions 450 while TOR ingress queue 410B is used to store non-relaxed ordered (nRO) transactions 450. In some embodiments, TOR ingress queues 410A-B are implemented as a single ingress queue with multiple linked list structures: at least one for RO transactions 450 and one for nRO transactions 450. While not illustrated, there may be other TOR ingress queues 410 that are used to store other types of transactions in linked list structures—e.g., a linked list structure for storing non-posted nRO DRAM transactions. Also, while only four counters 420 are illustrated, there may be more or less counters 420.

In order to facilitate the following discussion, consider embodiments in which a given nRO transaction 450 has to wait for preceding RO transactions 450 that were allocated (or in some embodiments, received at I/O agent 142) before it to complete before it can be issued to pipe arbiter 220. While this example involves waiting for a single transaction type (e.g., RO transactions), in various cases, a transaction type (e.g., non-posted nRO DRAM transactions) might have to wait for multiple transaction types (e.g., RO transactions, nRO transactions, and non-posted RO DRAM transactions) that precede it to complete.

For this discussion, initially a counter 420A is instantiated with an initial counter value of zero and used to track RO transactions 450 (the push transaction type set) on behalf of nRO transactions 450 (counter 420A's type)—the counter may be assigned to the nRO transaction type via an identifier in TOR 260. Thereafter, an RO transaction 450A is allocated at I/O agent 142 and stored in TOR ingress queue 410A. As part of allocating RO transaction 450A, at dispatch stage 310 of IOA pipeline 230 (or another stage, such as match stage 320 in some cases), counter 420A is incremented to have a counter value of one. Counter pointers 610 and a bound counter pointer 620 may be stored at TOR dependency 430 in association with RO transaction 450A. Counter pointers 610, in various embodiments, identify the counters 420 incremented by a transaction 450. As such, a counter pointer 610 is stored for RO transaction 450A that points to counter 420A, which was incremented by RO transaction 450A. A bound counter pointer 620, in various embodiments, identifies the counter 420 to which a transaction 450 is bound such that the transaction 450 may not be issued to pipe arbiter 220 while the counter has not reached its initial value (e.g., zero). In various cases, RO transactions 450 do not have to wait for preceding transactions of a different type and as a result, a bound counter pointer 620 is not stored in association with those transactions. Thus, a bound counter pointer 620 is not stored for RO transaction 450A.

After RO transaction 450A is allocated, an RO transaction 450B is allocated and stored behind RO transaction 450A in TOR ingress queue 410A. As part of allocating RO transaction 450B, counter 420A is incremented to have a counter value of two. A counter pointer 610 to counter 420A is stored for RO transaction 450B. Next, an nRO transaction 450E is allocated at I/O agent 142 and stored in TOR ingress queue 410B. As part of allocating nRO transaction 450E, a bound counter pointer 620 is stored for nRO transaction 450E that binds it to counter 420A and then a new counter 420B is instantiated with an initial value of zero and used to track subsequent RO transactions 450. While not shown, in various cases, one or more counters 420 may be incremented as part of allocating nRO transaction 450E and counter pointers 610 may be stored that identify those incremented counters.

After nRO transaction 450E is allocated, an RO transaction 450C is then allocated and stored behind RO transaction 450B in TOR ingress queue 410A as shown. As part of allocating RO transaction 450C, counter 420B instead of counter 420A is incremented to have a counter value of one. In various embodiments, I/O agent 142 ceases to increment a counter 420 while the counter 420 is bound to a transaction 450. That counter 420 may be incremented again when it is re-instantiated at a later point in time and not yet bound to a transaction 450. A counter pointer 610 to counter 420B is stored for RO transaction 450C. Thereafter, an nRO transaction 450F is allocated at I/O agent 142 and stored behind nRO transaction 450E in TOR ingress queue 410B. As part of allocating nRO transaction 450F, a bound counter pointer 620 is stored for nRO transaction 450F that binds it to counter 420B and then a new counter 420C is instantiated with an initial value of zero and used to track subsequent RO transactions 450. Next, an RO transaction 450D is allocated and stored behind RO transaction 450C in TOR ingress queue 410A. As part of allocating RO transaction 450D, counter 420C is incremented to have a counter value of one.

At some point, RO transactions 450A-B complete and in response to each completion, counter 420A is decremented (as it is identified by counter pointers 610 of those transactions) until it reaches its initial value. Thereafter, nRO transaction 450E may be sent to pipe arbiter 220. RO transaction 450C also completes and in response, counter 420B is decremented to have a value of zero. In some instances, RO transaction 450C may complete before both RO transactions 450A-B complete. As a result, counter 420B would reach a value of zero prior to counter 420A reaching zero. But because the linked list structure can enforce an ordering on the transactions 450 in that linked list structure, nRO transaction 450F is not permitted to issue to pipe arbiter 220 until after nRO transaction 450E. As a result of counters 420 and the linked list structure, a transaction of a specific type may be ensured that the preceding transactions 450 that belong to the push transaction type set have completed before it issues. Thus, while counter 420B does not track RO transactions 450A-B but nRO transaction 450F has to wait for RO transactions 450A-C to complete, nRO transaction 450F may be guaranteed that those transactions complete before it is released because of the linked list structure of ingress queue 410B and counter 420B.

The terms "increment" and "decrement" can be understood to encompass their common meanings, which as applied to a counter value respectively connote addition to and subtraction of a value (e.g., 1) from the counter value. It is contemplated, however, that equivalent counter behavior could be implemented using different arithmetic operations. For example, a counter could be implemented using negative values (e.g., 2's complement binary integers) such that "incrementing" the counter could involve subtraction rather than addition, and "decrementing" the counter could involve addition rather than subtraction. Accordingly, the terms "increment" and "decrement" should be understood to more generally encompass activities that respectively move a counter away from and towards an initial value (e.g., 0), regardless of whether the direction of counter movement is positive or negative.

Figure 7:
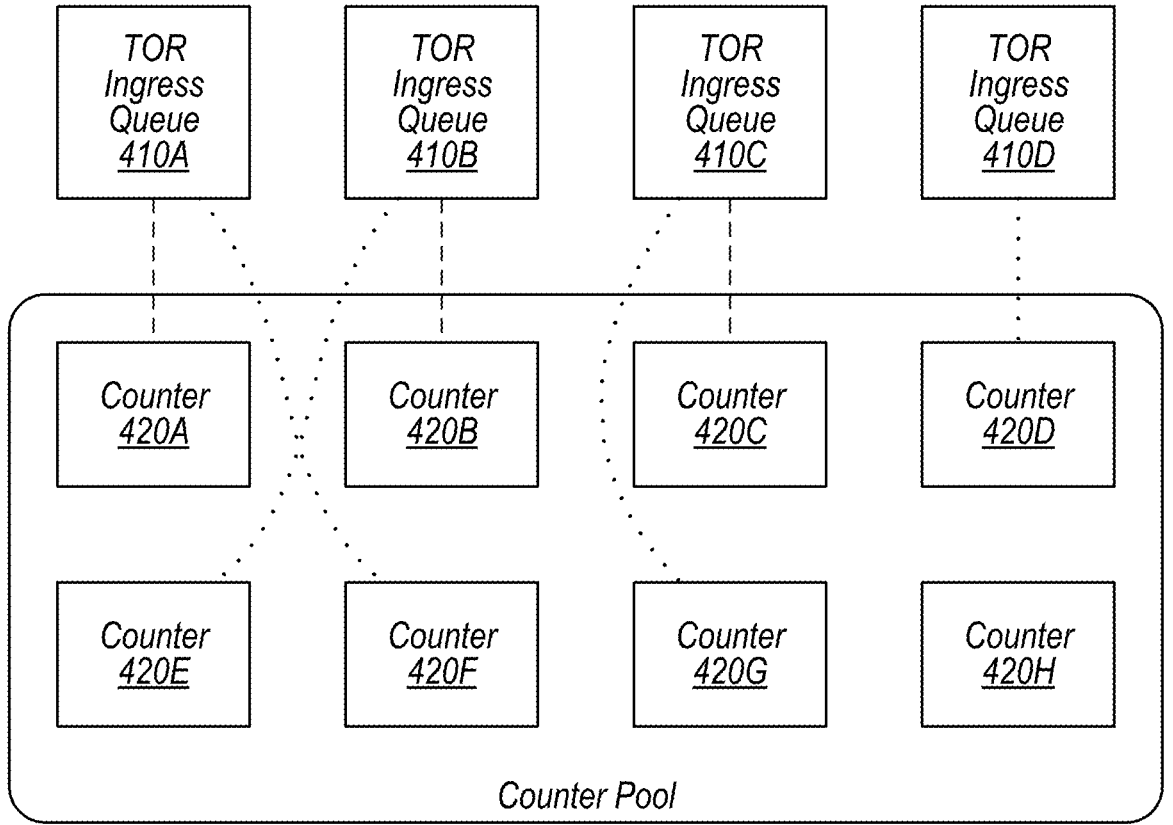
FIG. 7 is a block diagram illustrating example elements of associations between ingress queues and counters, according to some embodiments.

Turning now to FIG. 7, a block diagram of example associations between TOR ingress queues 410 and counters 420 is shown. In the illustrated embodiment, there are TOR ingress queues 410A-D and a counter pool that includes counters 420A-H. As depicted, there are four "active" counters 420 for the four TOR ingress queues 410A-D (which is shown with dotted lines between counters 420D-G and queues 410A-D), three bound counters 420 (which is shown with dashed lines between counters 420A-C and queues 410A-C, respectively), and one unused counter 410H. An active counter 420, in various embodiments, is a counter that has not been bound to a transaction 450 (via a bound counter pointer 620) and can be incremented in response to the allocation of transactions of the push transaction type set that corresponds to that counter 420. An active counter 420 may become a bound counter 420 when it is bound to a particular transaction 450 via a pointer 620. When a transaction 450 is allocated and stored at a TOR ingress queue 410, it may be bound to the active counter 420 of that TOR ingress queue 410 and a new active counter 420 may be instantiated for TOR ingress queue 410. For example, a transaction 450 may be stored at TOR ingress queue 410A and bound to counter 420F, causing counter 420F to become a bound counter 420, and counter 420H may become the new active counter 420 for TOR ingress queue 410A. In some embodiments, a TOR ingress queue 410 is associated with only active counter 420 at a given point in time. Accordingly, in the illustrated embodiment, there are four active counters 420D-G. A bound counter 420, in various embodiments, is a counter that can be decremented for only those transactions 450 that previously caused it to be incremented. A TOR ingress queue 410 may be associated with one or more bound counter 420 at a given point in time. An unused counter 420, in various embodiments, is a counter that is available for allocating as an active counter 420. When the transaction 450 associated with a bound counter 420 is completed, the bound counter 420 may be released to the counter pool and become unused. When a new active counter 420 is to be instantiated, an unused counter 420 may be selected from the counter pool and used as the active counter 420 and assigned to the appropriate transaction type.

Turning now to FIG. 8, a flow diagram of a method 800 is shown. Method 800 is one embodiment of a method performed by an I/O agent circuit (e.g., an I/O agent 142) in order to reject of one or more transactions, which may be received from a peripheral component (e.g., a peripheral 144). In some embodiments, method 800 includes more or less steps than shown—e.g., a step in which the I/O agent circuit evicts data from a cache after processing the set of transaction requests.

Method 800 begins in step 810 with the I/O agent circuit issuing, to a transaction pipeline (e.g., IOA pipeline 230) from a queue (e.g., TOR ingress queue 410A) of one or more queues, a transaction (e.g., a transaction 450) of a series of transactions enqueued in a particular order (e.g., in an order in which the transaction are received at the I/O agent circuit).

In step 820, the I/O agent circuit generates, at the transaction pipeline, a determination to return the transaction to the queue based on a detection of one or more conditions being satisfied. In various cases, the transaction may be a snoop transaction that is directed at a cache line included within the I/O agent circuit. Accordingly, the I/O agent circuit may issue a request (e.g., a data request 510) to fill the cache line with data and detect whether the cache line has been filled with the data. The detection of the one or more conditions being satisfied may be a detection that the cache line has not been filled. In various embodiments, the I/O agent circuit detects whether the cache line is targeted by a senior transaction of the one or more queues. Accordingly, the detection of the one or more conditions being satisfied may be a detection that the cache line is targeted by a senior transaction. In some cases, the I/O agent circuit may prevent a transaction of the same queue as the senior transaction from causing a request for the data to be issued—as the request may have already been sent because of the senior transaction.

In step 830, based on the determination, the I/O agent circuit rejects, at the transaction pipeline, up to a threshold number of transactions (e.g., seven transactions) that issued from the queue after the transaction issued. But the I/O agent circuit may process, at the transaction pipeline, one or more transactions from another queue (e.g., TOR ingress queue 410B) of the one or more queues while rejecting up to the threshold number of transactions from the queue of the returned transaction.

In step 840, the I/O agent circuit inserts the transaction at a head of the queue such that the transaction is enqueued at the queue sequentially first for the series of transactions according to the particular order. The I/O agent circuit may update a transaction table (e.g., TOR 260) to store state information for the first transaction that indicates a trigger event for releasing the first transaction from the first queue. After inserting the transaction at the head of the queue, the I/O agent circuit may cease issuing transactions from the queue until at least a determination is made that a cache line has been filed with requested data (if the trigger event is a data file) or that the particular senior transaction has retired (if the senior transaction retiring is a trigger event).

Turning now to FIG. 9, a flow diagram of a method 900 is shown. Method 900 is one embodiment of a method performed by an I/O agent circuit (e.g., an I/O agent 142) in order to reject of one or more transactions, which may be received from a peripheral component (e.g., a peripheral 144). In some embodiments, method 900 includes more or less steps than shown—e.g., a step in which the I/O agent circuit evicts data from a cache after processing the set of transaction requests.

Method 900 begins in step 910 with the I/O agent circuit enqueuing transactions (e.g., transactions 450) of the same transaction type (e.g., posted nRO transactions) in a queue (e.g., a TOR ingress queue 410) of a plurality of queues included in the I/O agent circuit. The one or more transactions may be maintained, in the queue, as a part of a linked list structure of ordered transactions that is associated with a virtual channel (e.g., bulk) included in a plurality of virtual channels (e.g., bulk and low latency) corresponding to the plurality of queues. The transactions may be received by the I/O agent circuit from one or more peripheral components coupled to the I/O agent circuit. The transactions may be nRO transactions, snoop transactions, etc.

In step 920, the I/O agent circuit issues, to a transaction pipeline (e.g., IOA pipeline 230) included in the I/O agent circuit, one or more transactions from the queue in a particular order. In step 930, the I/O agent circuit determines, at the transaction pipeline, that a condition associated with a transaction of the one or more transactions has been satisfied. In some cases, determining that the condition has been satisfied includes determining that an event triggered (e.g., a data request that has not been filled) by another transaction of a different queue of the plurality of queues has not been completed. In some cases, determining that the condition has been satisfied may include determining to retry the transaction in response to the transaction being unserviceable based on a current state of the I/O agent circuit (e.g., a snoop transaction snooped data required for a posted nRO transaction (the transaction to be rejected)).

In step 940, based on the determining, the I/O agent circuit rejects, from the one or more transactions, the transaction and up to a threshold number of transactions that are subsequently after the transaction according to the particular order. The rejected transactions are re-enqueued in the queue such that the particular order is maintained in the queue. The threshold number of transactions may be based on a number of cycles involved to re-enqueue the initially rejected transaction in the queue. After rejecting the transaction, the I/O agent circuit may release the transaction from the queue to the transaction pipeline in response to an event being completed (e.g., a data fill being completed).

Turning now to FIG. 10, a flow diagram of a method 1000 is shown. Method 1000 is one embodiment of a method performed by an I/O agent circuit (e.g., an I/O agent 142) to use counters in tracking whether a transaction can be released from a queue. In some embodiments, method 1000 includes more or less steps than shown—e.g., a step in which the I/O agent circuit evicts data from a cache after processing the set of transaction requests.

Method 1000 begins in step 1010 with the I/O agent circuit initializing a first counter (e.g., a counter 420) included in the pool of counters with an initial counter value (e.g., zero). In step 1020, the I/O agent circuit assigns the first counter to a specific transaction type (e.g., a posted nRO transaction). In step 1030, the I/O agent circuit increments the first counter as a part of allocating a transaction of a transaction type (e.g., a posted RO transaction) included in a set of transaction types different than the specific transaction type.

In step 1040, based on receiving a transaction request to process a first transaction of the specific transaction type, the I/O agent circuit binds the first transaction to the first counter (e.g., via a bound counter pointer 620) and ceases to increment the first counter while the first counter is bound to the first transaction. Based on receiving the transaction request to process the first transaction, the I/O agent circuit may initialize a second counter and assign the second counter to the specific transaction type. The I/O agent circuit may then increment the second counter instead of the first counter as a part of allocating a transaction of a transaction type included in the set of transaction types different than the specific transaction type. Based on receiving the transaction request to process the first transaction, the I/O agent circuit may also increment one or more counters of the pool of counters based on the specific transaction type of the first transaction. The I/O agent circuit may store, in association with the first transaction, one or more pointers (e.g., counter pointers 610) that identify the one or more counters. The one or more counters may be incremented on an initial pipeline pass of the first transaction through a transaction pipeline (e.g., IOA pipeline 230).

In step 1050, the I/O agent circuit issues the first transaction to the transaction pipeline based on a counter value stored by the first counter matching the initial counter value. In some cases the I/O agent circuit issues the first transaction to the transaction pipeline based further on detecting that the first transaction is at a head of a queue associated with the first transaction. Based on a retirement of the first transaction, the I/O agent circuit may decrement the one or more counters identified by the one or more pointers associated with the first transaction. The one or more counters may be decremented as part of a subsequent pipeline pass of the first transaction. Based on a retirement of the first transaction, the I/O agent circuit release the first counter to the pool of counters such that the first counter is available to bind to another transaction.

Turning now to FIG. 11, a flow diagram of a method 1100 is shown. Method 1100 is one embodiment of a method performed by a computer system (e.g., a system that includes an I/O agent 142) to use counters in tracking whether a transaction can be released from a queue. In some embodiments, method 1100 includes more or less steps than shown—e.g., a step in which the computer system evicts data from a cache after processing the set of transaction requests.

Method 1100 begins in step 1110 with the computer system initializing a plurality of counters (e.g., counters 420) that respectively correspond to a plurality of different transaction types (e.g., TOR ingress queues 410). In step 1120, the computer system allocates a first transaction (e.g., a transaction 450), including incrementing one or more of the plurality of counters whose corresponding transaction types belong to a set of transaction types different than a transaction type of the first transaction. The computer system may store, for the first transaction, one or more pointers (e.g., counter pointers 620 that identify the one or more counters that were incremented based on the first transaction In step 1130, after allocating the first transaction, the computer system allocates a second transaction, including binding the second transaction to a first counter of the one or more counters such that the second transaction is prevented from issuing to a transaction pipeline while the first transaction has not been completed. While the first counter is bound to the second transaction, the first counter may not be bound to another transaction. The computer system may maintain a linked list of ordered transactions having the same transaction type. The second transaction may be included in the linked list and is prevented from issuing to the transaction pipeline while the second transaction is not at a head of the linked list. At least two transactions in the linked list may be bound to different counters of the plurality of counters. The linked list may be associated with a virtual channel included in a plurality of virtual channels that share the plurality of counters.

In step 1140, the computer system completes the first transaction, including decrementing the one or more counters. The decrementing may be performed using the one or more pointers. The computer system may issue the second transaction to the transaction pipeline based on the first counter indicating that all transactions that caused the first counter to be incremented have been completed. The first transaction may be a posted transaction and the second transaction may be a non-posted transaction.

Figure 12:
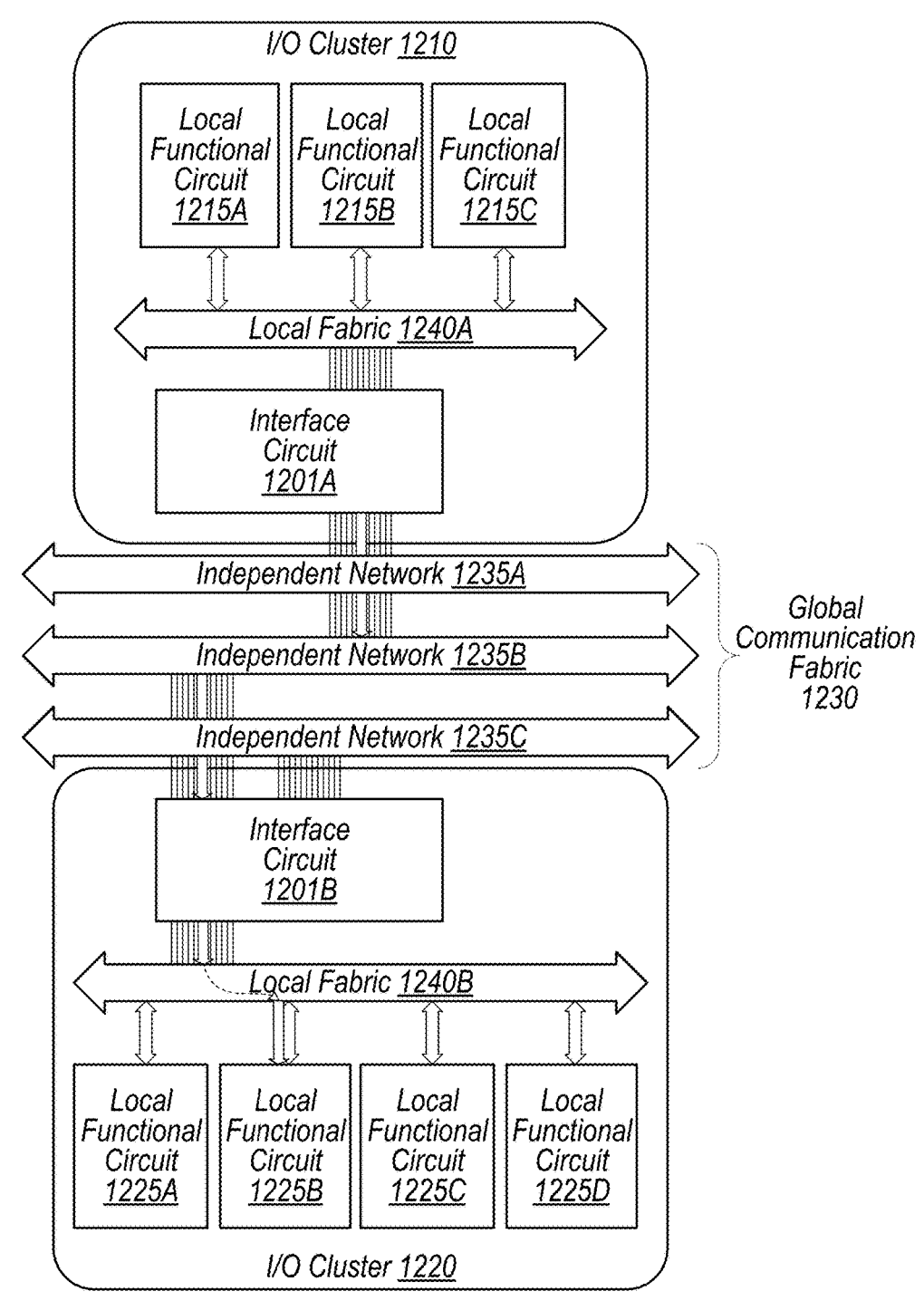
FIG. 12 is a block diagram illustrating example elements of an SOC that includes multiple independent networks as well as local fabrics, according to some embodiments.

Turning now to FIG. 12, a block diagram of example elements of an SOC that includes multiple independent networks as well as local fabrics is shown. SOC 1200 is an embodiment of SOC 100. In the illustrated embodiment, SOC 1200 includes a pair of interface circuits 1201A and 1201B (collectively referred to as interface circuits 1201) each coupling a respective local fabric 1240A and 1240B (collectively 1240) to one or more independent networks 1235A-1235C of global communication fabric 1230 (which is an embodiment of interconnect 105). Interface circuits 1201A and 1201B are embodiments of different I/O agents 142. Local fabric 1240A is coupled to a set of local functional circuits 1215A-1215C (1215 collectively) and local fabric 1240B is coupled to a set of local functional circuits 1225A-1225D (1225 collectively). Interface circuit 1201A, local fabric 1240A, and the set of local functional circuits 1215 are included in input/output (I/O) cluster 1210. In a similar manner, interface circuit 1201B, local fabric 1240B, and the set of local functional circuits 1225 are included in I/O cluster 1220. I/O cluster 1210 and/or I/O cluster 1220 may be embodiments of I/O cluster 140.

As shown, global communication fabric 1230 includes multiple independent networks 1235A-1235C, wherein ones of independent networks 1235A-1235C have different communication and coherency protocols. For example, independent network 1235A may be a CPU network that supports cache coherency as well as low-latency transactions between a plurality of CPU cores and one or more memory controllers to access, e.g., volatile and non-volatile memories. Independent network 1235B may, in some embodiments, be a relaxed-order network that does not enforce cache coherency and may support lowest quality-of-service (QoS) bulk transactions as well higher QoS low-latency transactions. Components coupled to independent network 1235B may include functional circuits that include their own memory resources, and are, therefore, not dependent on memory resources accessed via global communication fabric 1230. Independent network 1235C may, for example, be an input/output (I/O) network that also supports cache coherency and low-latency transactions between memories and some peripheral circuits. Such an I/O network may further support additional protocols such as real-time transactions that have a higher QoS than low-latency transactions. For example, peripheral circuits (e.g., peripherals 144) used in a smartphone may include I/O circuits for communicating with a cellular radio and utilizing real-time priorities to manage an active phone call.

I/O clusters 1210 and 1220, as illustrated, include different sets of local functional circuits 1215 and 1225, respectively. I/O cluster 1210 is coupled to independent network 1235B of global communication fabric 1230, while I/O cluster 1220 is coupled to independent networks 1235B and 1235C. I/O cluster 1210 may include, for example, a set of serial interfaces, such as universal serial bus (USB) circuits for communicating with USB peripherals. I/O cluster 1220, on the other hand, may include a set of display circuits for communicating with one or more display devices. Individual ones of local functional circuits 1215 may perform different functions. For example, local functional circuit 1215A may be a USB interface coupled to a USB port on a device that includes SOC 1200, local functional circuit 1215B may be a Firewire® interface coupled to a Firewire port on the device, and local functional circuit 1215C may be a Bluetooth interface to a Bluetooth radio included in the device.

Local fabric 1240A supports communication between respective ones of local functional circuits 1215 and, similarly, local fabric 1240B supports communication between respective ones of local functional circuits 1225. Each of local fabrics 1240 includes at least one communication bus for exchanging transactions locally among the respective groups of local functional circuits 1215 and 1225. In various embodiments, either of local fabrics 1240 may include additional buses, arranged in any suitable topology (e.g., mesh, ring, tree, etc.), that are coupled together via one or more bus multiplexing circuits.

Interface circuit 1201B, coupled to local fabric 1240B, is configured to bridge transactions between local functional circuits 1225 and global communication fabric 1230. For example, data for new image frames and/or overlays for a currently displayed image may be sent from a CPU or a GPU included elsewhere in SOC 1200 to one or more of local functional circuits 1225 to be shown on one of the display devices. In a similar manner, interface circuit 1201A, coupled to local fabric 1240A, is configured to bridge transactions between local functional circuits 1215 and global communication fabric 1230. Interface circuits 1201A and 1201B, as shown, are arranged such that they operate between I/O clusters 1210 and 1220, respectively, and global communication fabric 1230.

It is noted that the SOC of FIG. 12 is merely an example for demonstrating the disclosed concepts. In other embodiments, different combinations of elements may be included in the SOC. For example, any suitable number of I/O cluster may be included, with each cluster including any suitable number of functional circuits. Although the global communication fabric is shown with three independent networks, any suitable number of independent networks may be included, in other embodiments. In some embodiments, the illustrated elements may be arranged in a different manner.

The SOC of FIG. 12 is described as including several networks that may support various communication and coherency protocols. Various network topologies, with associated protocols are contemplated. Three such network topologies that may be utilized in a global communication fabric are disclosed in FIGS. 13-16.

Turning now to FIG. 13, a block diagram of one embodiment of a network 1300 using a ring topology to couple a plurality of agents (e.g., I/O agents 142) is shown. In the example of FIG. 13, the ring is formed from network switches 1314AA-1314AH. Agent 1310A is coupled to network switch 1314AA, agent 1310B is coupled to network switch 1314AB, and agent 1310C is coupled to network switch 1314AE.

As shown, a network switch is a circuit that is configured to receive communications on a network and forward the communications on the network in the direction of the destination of the communication. For example, a communication sourced by a processor (e.g., processor 112) may be transmitted to a memory controller (e.g., a memory controller 120) that controls the memory (e.g., a memory 130) that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers, queues, such as queues 255, or linked lists within a queue) so that communications on the virtual channels may remain logically independent. The network switch may also employ arbitration circuitry to select among buffered communications to forward on the network. Virtual channels may be channels that physically share a network but which are logically independent on the network (e.g., communications in one virtual channel do not block progress of communications on another virtual channel).

In a ring topology, each network switch 1314AA-1314AH may be connected to two other network switches 1314AA-1314AH, and the switches form a ring such that any network switch 1314AA-1314AH may reach any other network switch in the ring by transmitting a communication on the ring in the direction of the other network switch. A given communication may pass through one or more intermediate network switches in the ring to reach the targeted network switch. When a given network switch 1314AA-1314AH receives a communication from an adjacent network switch 1314AA-1314AH on the ring, the given network switch may examine the communication to determine if an agent 210A-210C to which the given network switch is coupled is the destination of the communication. If so, the given network switch may terminate the communication and forward the communication to the agent. If not, the given network switch may forward the communication to the next network switch on the ring (e.g., the other network switch 1314AA-1314AH that is adjacent to the given network switch and is not the adjacent network switch from which the given network switch received the communication). As used herein, an "adjacent network switch" to a given network switch may be a network switch to which the given network switch may directly transmit a communication, without the communication traveling through any intermediate network switches.

Turning now to FIG. 14, a block diagram of one embodiment of a network 1400 using a mesh topology to couple agents 1410A-1410P (e.g., I/O agents 142) is illustrated. As shown in FIG. 14, network 1400 may include network switches 1414AA-1414AH. Network switches 1414AA-1414AH are coupled to two or more other network switches. For example, network switch 1414AA is coupled to network switches 1414AB and 1414AE; network switch 1414AB is coupled to network switches 1414AA, 1414AF, and 1414AC; etc. as illustrated in FIG. 14. Thus, individual network switches in a mesh network may be coupled to a different number of other network switches. Furthermore, while network 1400 has a relatively symmetrical structure, other mesh networks may be asymmetrical, for example, depending on the various traffic patterns that are expected to be prevalent on the network. At each network switch 1414AA-1414AH, one or more attributes of a received communication may be used to determine the adjacent network switch 1214AA-1214AH to which the receiving network switch 1414AA-1414AH will transmit the communication (unless an agent 1410A-1410P to which the receiving network switch 1414AA-1414AH is coupled is the destination of the communication, in which case the receiving network switch 1414AA-1414AH may terminate the communication on network 1400 and provide it to the destination agent 1410A-1410P). For example, in an embodiment, network switches 1414AA-1414AH may be programmed at system initialization to route communications based on various attributes.

In an embodiment, communications may be routed based on the destination agent. The routings may be configured to transport the communications through the fewest number of network switches (the "shortest path) between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example. Additionally, a path may change between two particular network switches for different communications at different times. For example, one or more intermediate network switches in a first path used to transmit a first communication may experience heavy traffic volume when a second communication is sent at a later time. To avoid delays that may result from the heavy traffic, the second communication may be routed via a second path that avoids the heavy traffic.

FIG. 14 may be an example of a partially-connected mesh: at least some communications may pass through one or more intermediate network switches in the mesh. A fully-connected mesh may have a connection from each network switch to each other network switch, and thus any communication may be transmitted without traversing any intermediate network switches. Any level of interconnectedness may be used in various embodiments.

Figure 15:
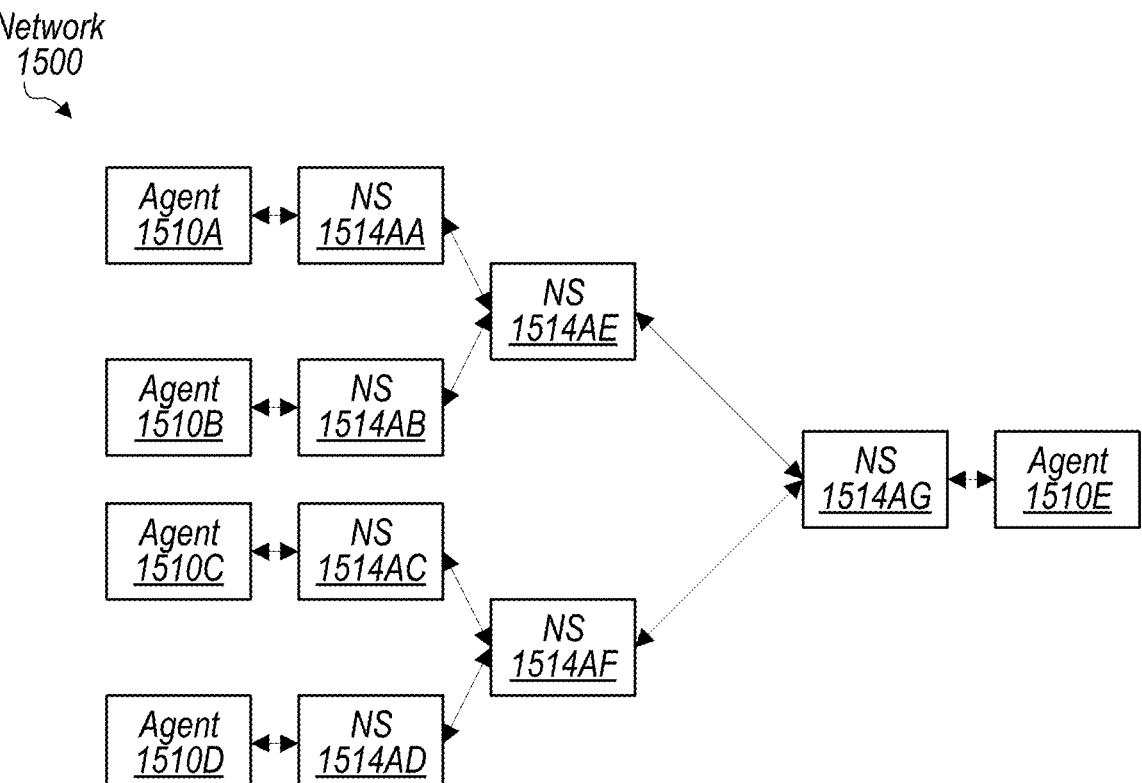
FIG. 15 is a block diagram illustrating example elements of a network using a tree topology, according to some embodiments.

Turning now to FIG. 15, a block diagram of one embodiment of a network 1500 using a tree topology to couple agents 1510A-1510E (e.g., I/O agents 142) is shown. The network switches 1514AA-1514AG are interconnected to form the tree in this example. The tree is a form of hierarchical network in which there are edge network switches (e.g., 1514AA, 1514AB, 1514AC, 1514AD, and 1514AG in FIG. 15) that couple, respectively, to agents 1510A-1510E and intermediate network switches (e.g., 1514AE and 1514AF in FIG. 15) that couple only to other network switches. A tree network may be used, e.g., when a particular agent is often a destination and/or a source for communications issued by other agents. Thus, for example, network 1500 may be used for agent 1510E being a principal source and/or destination for communications to/from agents 1510A-1510D. For example, the agent 1510E may be a memory controller which would frequently be a destination for memory transactions.

There are many other possible topologies that may be used in other embodiments. For example, a star topology has a source/destination agent in the "center" of a network and other agents may couple to the center agent directly or through a series of network switches. Like a tree topology, a star topology may be used in a case where the center agent is frequently a source or destination of communications. A shared bus topology may be used, and hybrids of two or more of any of the topologies may be used.

FIGS. 13-15 illustrate a variety of network topologies that may be used in a given SOC (e.g., SOC 100). In some embodiments, an SOC may include more than one type of network topology in a single SOC. Referring back to FIG. 12 for example, independent network 1235A may have a ring topology, independent network 1235B may have a mesh topology, and independent network 1235C may have a tree topology. Any suitable combination of topologies are contemplated for other embodiments. Another SOC with multiple types of network topologies is shown in FIG. 16.

Figure 16:
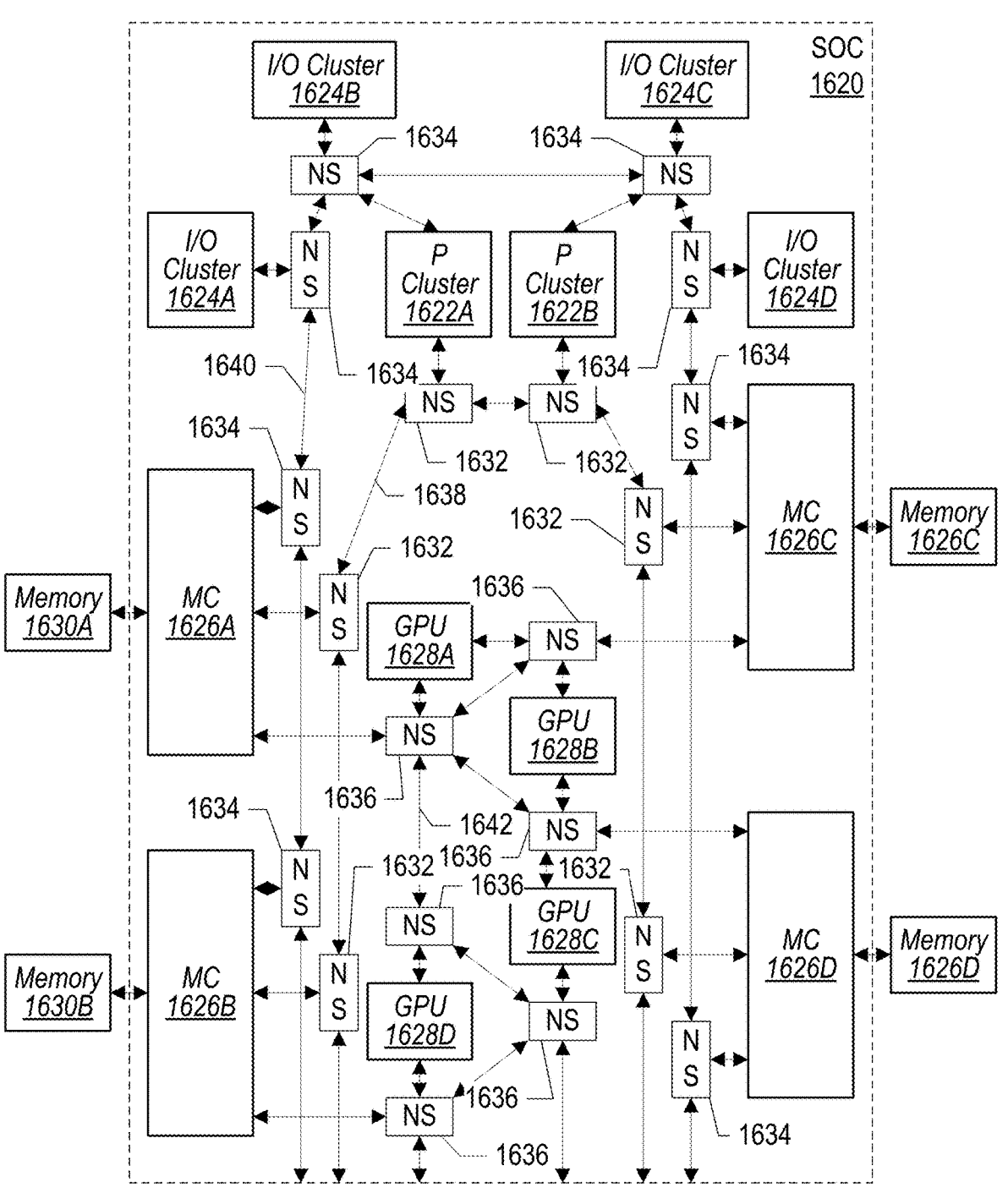
FIG. 16 is a block diagram illustrating example elements of another SOC that includes multiple networks, according to some embodiments.

Turning now to FIG. 16, a block diagram of one embodiment of an SOC 1620 having multiple networks with different topologies is illustrated. SOC 1620 is an embodiment of SOC 100. In the illustrated embodiment, the SOC 1620 includes a plurality of processor clusters (P clusters) 1622A-1622B, a plurality of input/output (I/O) clusters 1624A-1624D, a plurality of memory controllers 1626A-1626D, and a plurality of graphics processing units (GPUs) 1628A-1628D. The memories 1630A-1630D are coupled to the SOC 1620, and more specifically to the memory controllers 1626A-1626D respectively as shown in FIG. 16. As implied by the name (SOC), the components illustrated in FIG. 16 (except for the memories 1630A-1630D in this embodiment) may be integrated onto a single semiconductor die or "chip." However, other embodiments may employ two or more die coupled or packaged in any desired fashion.

In the illustrated embodiment, the SOC 1620 includes three physically and logically independent networks formed from a plurality of network switches 1632, 1634, and 1636 as shown in FIG. 16 and interconnect therebetween, illustrated as arrows between the network switches and other components. Collectively, these independent networks form a global communication fabric, enabling transactions to be exchanged across SOC 1620. Other embodiments may include more or fewer networks. The network switches 1632, 1634, and 1636 may be instances of network switches similar to the network switches as described above with regard to FIGS. 13-15, for example. The plurality of network switches 1632, 1634, and 1636 are coupled to the plurality of P clusters 1622A-1622B, the plurality of GPUs 1628A-1628D, the plurality of memory controllers 1626A-1625B, and the plurality of I/O clusters 1624A-1624D as shown in FIG. 16. The P clusters 1622A-1622B, the GPUs 1628A-1628B, the memory controllers 1626A-1626B, and the I/O clusters 1624A-1624D may all be examples of agents that communicate on the various networks of the SOC 1620. Other agents may be included as desired. In some embodiments, ones of I/O clusters 1624A-1624D may correspond to I/O clusters 140. It is noted that the complexity of the multiple independent networks of SOC 1620 may hinder or prevent direct access to interface circuits 1201 of FIG. 12.

In FIG. 16, a central processing unit (CPU) network is formed from a first subset of the plurality of network switches (e.g., network switches 1632) and interconnect therebetween such as reference numeral 1638. The CPU network couples the P clusters 1622A-1622B and the memory controllers 1626A-1626D. An I/O network is formed from a second subset of the plurality of network switches (e.g., network switches 1634) and interconnect therebetween such as reference numeral 1640. The I/O network couples the P clusters 1622A-1622B, the I/O clusters 1624A-1624D, and the memory controllers 1626A-1626B. A relaxed order network is formed from a third subset of the plurality of network switches (e.g., network switches 1636) and interconnect therebetween such as reference numeral 1642. The relaxed order network couples the GPUs 1628A-1628D and the memory controllers 1626A-1626D. In an embodiment, the relaxed order network may also couple selected ones of the I/O clusters 1624A-1624D as well.

As mentioned above, the CPU network, the I/O network, and the relaxed order network are independent of each other (e.g., logically and physically independent). In an embodiment, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

The interconnect between the network switches 1632, 1634, and 1636 may have and form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

In an embodiment, the SOC 1620 may be designed to couple directly to one or more other instances of the SOC 1620, coupling a given network on the instances as logically one network on which an agent on one die may communicate logically over the network to an agent on a different die in the same way that the agent communicates within another agent on the same die. While the latency may be different, the communication may be performed in the same fashion. Thus, as illustrated in FIG. 16, the networks extend to the bottom of the SOC 1620 as oriented in FIG. 16. Interface circuitry (e.g., serializer/deserializer (SERDES) circuits), not shown in FIG. 16, may be used to communicate across the die boundary to another die. In other embodiments, the networks may be closed networks that communicate only intra-die.

As mentioned above, different networks may have different topologies. In the embodiment of FIG. 16, for example, the CPU and I/O networks implement a ring topology, and the relaxed order may implement a mesh topology. However, other topologies may be used in other embodiments.

It is noted that the SOC of FIG. 16 is merely an example. Elements for illustrated the disclosed concepts are shown while other elements typical of an SOC have been omitted for clarity. For example, while specific numbers of P clusters 1622A-1622B, I/O clusters 1624A-1624D, memory controllers 1626A-1626D, and GPUs 1628A-1628D are shown in the example of FIG. 16, the number and arrangement of any of the above components may be varied and may be more or less than the number shown in FIG. 16.

In the descriptions of I/O clusters in FIG. 12, reference is made to formats for transactions sent via a local fabric and via the independent networks of the global communication fabric. Formats for data packets used on a given type of bus or network may be implemented in a variety of fashions.

Figure 17:
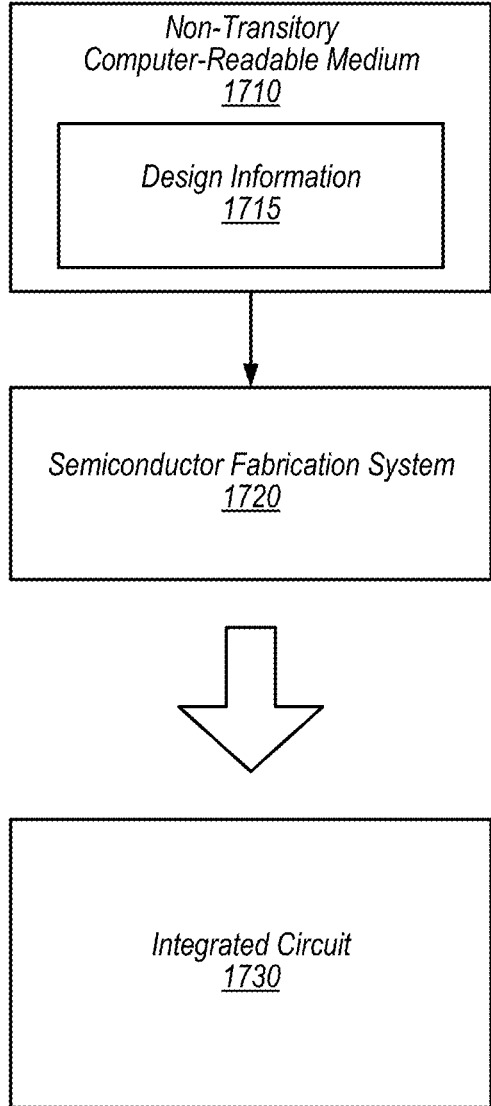
FIG. 17 is a block diagram illustrating an example process of fabricating at least a portion of an SOC, according to some embodiments.

Turning now to FIG. 17, a block diagram illustrating an example process of fabricating an integrated circuit 1730 that can include at least a portion of SOC 100 (or SOC 1200) is shown. The illustrated embodiment includes a non-transitory computer-readable medium 1710 (which includes design information 1715), a semiconductor fabrication system 1720, and a resulting fabricated integrated circuit 1730. In some embodiments, integrated circuit 1730 includes at least a caching agent 110, a memory controller 120, a memory 130, and an I/O cluster 140—in some cases, that memory 130 and one or more peripherals of that I/O cluster 140 may be separate from integrated circuit 1730. Integrated circuit 1730 may further additionally or alternatively includes other circuits such as a wireless network circuit. In the illustrated embodiment, semiconductor fabrication system 1720 is configured to process design information 1715 to fabricate integrated circuit 1730.

Non-transitory computer-readable medium 1710 may include any of various appropriate types of memory devices or storage devices. For example, non-transitory computer-readable medium 1710 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 1710 may include two or more memory mediums, which may reside in different locations (e.g., in different computer systems that are connected over a network).

Design information 1715 may be specified using any of various appropriate computer languages, including hardware description languages such as, without limitation: VHDL, Verilog, SystemC, SystemVerilog, RHDL, M, MyHDL, etc. Design information 1715 may be usable by semiconductor fabrication system 1720 to fabricate at least a portion of integrated circuit 1730. The format of design information 1715 may be recognized by at least one semiconductor fabrication system 1720. In some embodiments, design information 1715 may also include one or more cell libraries, which specify the synthesis and/or layout of integrated circuit 1730. In some embodiments, the design information is specified in whole or in part in the form of a netlist that specifies cell library elements and their connectivity. Design information 1715, taken alone, may or may not include sufficient information for fabrication of a corresponding integrated circuit (e.g., integrated circuit 1730). For example, design information 1715 may specify circuit elements to be fabricated but not their physical layout. In this case, design information 1715 may be combined with layout information to fabricate the specified integrated circuit.

Semiconductor fabrication system 1720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1720 may also be configured to perform various testing of fabricated circuits for correct operation.

In various embodiments, integrated circuit 1730 is configured to operate according to a circuit design specified by design information 1715, which may include performing any of the functionality described herein. For example, integrated circuit 1730 may include any of various elements described with reference to FIGS. 1-16. Furthermore, integrated circuit 1730 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 1730 is performed. Design information 1715 may be generated using one or more computer systems and stored in non-transitory computer-readable medium 1710. The method may conclude when design information 1715 is sent to semiconductor fabrication system 1720 or prior to design information 1715 being sent to semiconductor fabrication system 1720. Accordingly, in some embodiments, the method may not include actions performed by semiconductor fabrication system 1720. Design information 1715 may be sent to semiconductor fabrication system 1720 in a variety of ways. For example, design information 1715 may be transmitted (e.g., via a transmission medium such as the Internet) from non-transitory computer-readable medium 1710 to semiconductor fabrication system 1720 (e.g., directly or indirectly). As another example, non-transitory computer-readable medium 1710 may be sent to semiconductor fabrication system 1720. In response to the method of initiating fabrication, semiconductor fabrication system 1720 may fabricate integrated circuit 1730 as discussed above.

Figure 18:
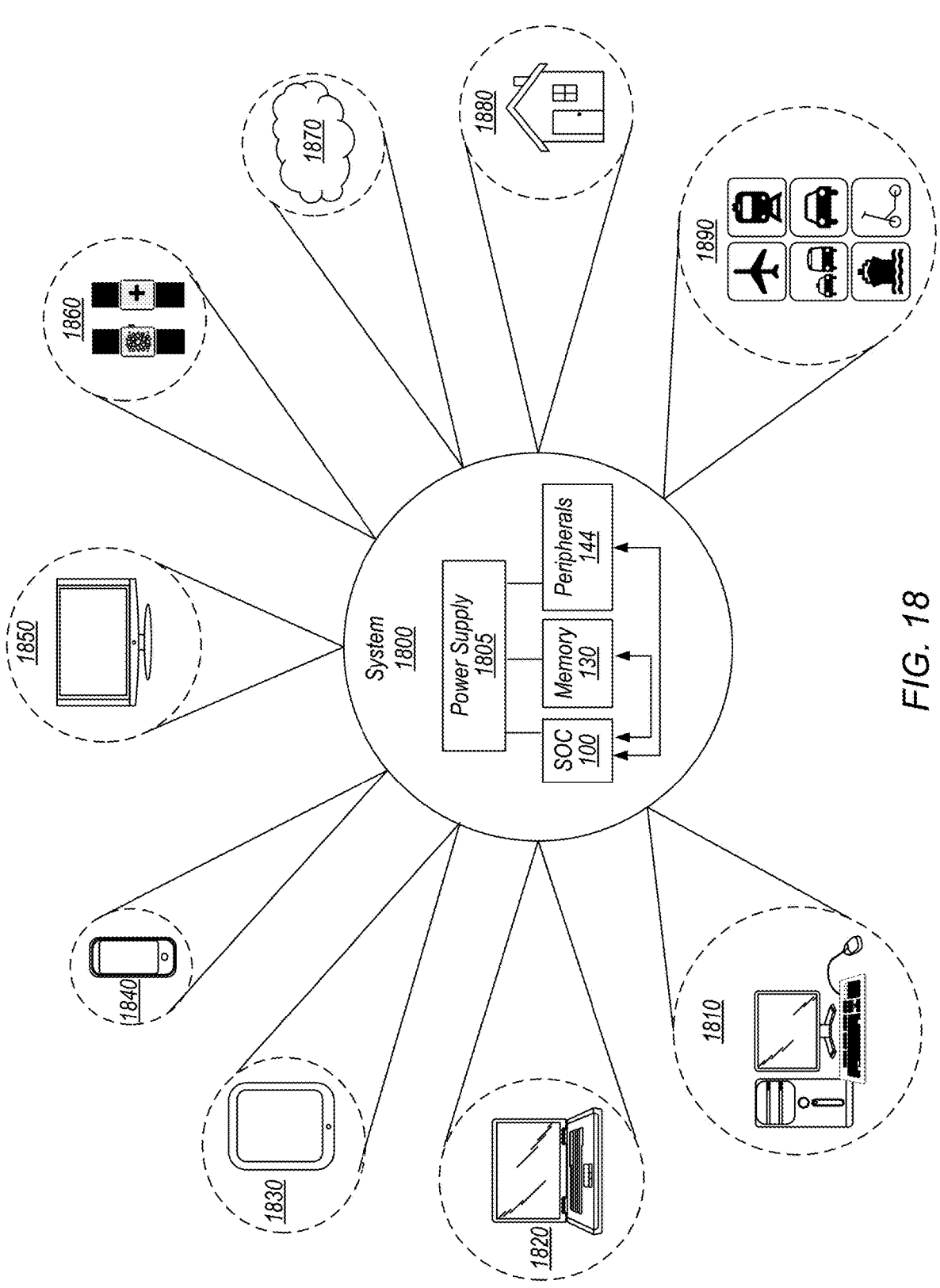
FIG. 18 is a block diagram illustrating an example SOC that is usable in various types of systems, according to some embodiments.

Turning next to FIG. 18, a block diagram of one embodiment of a system 1800 is shown that may incorporate and/or otherwise utilize the methods and mechanisms described herein. In the illustrated embodiment, the system 1800 includes at least one instance of a system on chip (SOC) 100 that is coupled to external memory 130, peripherals 144, and a power supply 1805. Power supply 1805 is also provided which supplies the supply voltages to SOC 100 as well as one or more supply voltages to the memory 130 and/or the peripherals 144. In various embodiments, power supply 1805 represents a battery (e.g., a rechargeable battery in a smart phone, laptop or tablet computer, or other device). In some embodiments, more than one instance of SOC 100 is included (and more than one external memory 130 is included as well).

As illustrated, system 1800 is shown to have application in a wide range of areas. For example, system 1800 may be utilized as part of the chips, circuitry, components, etc., of a desktop computer 1810, laptop computer 1820, tablet computer 1830, cellular or mobile phone 1840, or television 1850 (or set-top box coupled to a television). Also illustrated is a smartwatch and health monitoring device 1860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1800 may further be used as part of a cloud-based service(s) 1870. For example, the previously mentioned devices, and/or other devices, may access computing resources in the cloud (e.g., remotely located hardware and/or software resources). Still further, system 1800 may be utilized in one or more devices of a home 1880 other than those previously mentioned. For example, appliances within home 1880 may monitor and detect conditions that warrant attention. For example, various devices within home 1880 (e.g., a refrigerator, a cooling system, etc.) may monitor the status of the device and provide an alert to the homeowner (or, for example, a repair facility) should a particular event be detected. Alternatively, a thermostat may monitor the temperature in home 1880 and may automate adjustments to a heating/cooling system based on a history of responses to various conditions by the homeowner. Also illustrated in FIG. 18 is the application of system 1800 to various modes of transportation 1890. For example, system 1800 may be used in the control and/or entertainment systems of aircraft, trains, buses, cars for hire, private automobiles, waterborne vessels from private boats to cruise liners, scooters (for rent or owned), and so on. In various cases, system 1800 may be used to provide automated guidance (e.g., self-driving vehicles), general systems control, and otherwise. These any many other embodiments are possible and are contemplated.

It is noted that the devices and applications illustrated in FIG. 18 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a memory controller circuit that is configured to couple to a memory and manage access to the memory;

an input/output (I/O) agent circuit that includes a transaction pipeline and a pool of counters; and a first interconnect that is configured to couple the memory controller circuit and the I/O agent circuit;

a second interconnect that is configured to couple the I/O agent circuit and one or more peripheral components;

wherein the I/O agent circuit is configured to bridge the one or more peripheral components from the second interconnect to the first interconnect and implement coherency mechanisms for transactions associated with the one or more peripheral components, and wherein the I/O agent circuit is configured to:

initialize a first counter included in the pool of counters with an initial counter value;

assign the first counter to a specific transaction type;

increment the first counter assigned to the specific transaction type in response to allocating a transaction of a particular, different transaction type than the specific transaction type;

based on receiving a transaction request to process a first transaction of the specific transaction type, store pointer information to bind the first transaction to the first counter, wherein the first transaction is associated with a particular one of the one or more peripheral components; and issue the first transaction to the transaction pipeline based on a counter value stored by the first counter matching the initial counter value.

2. The apparatus of claim 1, wherein the I/O agent circuit is further configured to:

based on receiving the transaction request to process the first transaction, initialize a second counter and assign the second counter to the specific transaction type; and increment the second counter instead of the first counter as a part of allocating a transaction of the particular, different transaction type that is different than the specific transaction type.

3. The apparatus of claim 1, wherein the I/O agent circuit is further configured to:

based on receipt of the transaction request to process the first transaction, increment one or more counters of the pool of counters based on the specific transaction type of the first transaction; and store, in association with the first transaction, one or more pointers that identify the one or more counters.

4. The apparatus of claim 3, wherein the I/O agent circuit is further configured to:

based on a retirement of the first transaction, decrement the one or more counters identified by the one or more pointers associated with the first transaction.

5. The apparatus of claim 1, wherein the I/O agent circuit is further configured to:

based on a retirement of the first transaction, release the first counter to the pool of counters such that the first counter is available to bind to another transaction.

6. The apparatus of claim 1, wherein the I/O agent circuit is further configured to:

cease to increment the first counter while the first counter is bound to the first transaction.

7. The apparatus of claim 1, wherein the I/O agent circuit is further configured to:

store transactions of a given one of a plurality of transaction types in a corresponding one of a plurality of queues, and wherein the I/O agent circuit is configured to issue the first transaction to the transaction pipeline based further on detecting that the first transaction is at a head of a queue associated with the first transaction.

8. A method, comprising:

initializing, by an input/output (I/O) agent circuit included in a computer system, a plurality of counters that respectively correspond to a plurality of different transaction types, wherein the I/O agent circuit includes a transaction pipeline and the plurality of counters, wherein the I/O agent circuit is configured to bridge one or more peripheral components coupled to a first interconnect to a second interconnect coupled to a memory controller circuit, and wherein the I/O agent circuit is configured to implement coherency mechanisms for transactions associated with the one or more peripheral components;

allocating, by the I/O agent circuit, a first transaction, including incrementing one or more of the plurality of counters corresponding to different transaction types than a transaction type of the first transaction;

after allocating the first transaction, the I/O agent circuit allocating a second transaction of a different transaction type than the first transaction, including binding the second transaction to a first counter of the one or more counters such that the second transaction is prevented from issuing to the transaction pipeline while the first transaction has not been completed, wherein the second transaction is associated with a particular one of the one or more peripheral components; and completing, by the I/O agent circuit, the first transaction, including decrementing the one or more counters.

9. The method of claim 8, further comprising:

issuing, by the I/O agent circuit, the second transaction to the transaction pipeline based on the first counter indicating that all transactions that caused the first counter to be incremented have been completed.

10. The method of claim 9, further comprising:

storing, by the I/O agent circuit for the first transaction, one or more pointers that identify the one or more counters that were incremented based on the first transaction, wherein the decrementing is performed using the one or more pointers.

11. The method of claim 8, further comprising:

maintaining, by the I/O agent circuit, a linked list of ordered transactions having the same transaction type, wherein the second transaction is included in the linked list and is prevented from issuing to the transaction pipeline while the second transaction is not at a head of the linked list.

12. The method of claim 11, wherein at least two transactions in the linked list are bound to different counters of the plurality of counters.

13. The method of claim 11, wherein the linked list is associated with a virtual channel included in a plurality of virtual channels that share the plurality of counters.

14. The method of claim 8, wherein while the first counter is bound to the second transaction, the first counter is not bound to another transaction.

15. The method of claim 8, wherein the first transaction is a posted-based transaction and the second transaction is a non-posted-based transaction.

16. A non-transitory computer readable medium having stored thereon design information that specifies a circuit design in a format recognized by a fabrication system that is configured to use the design information to fabricate an integrated circuit that comprises:

a memory controller circuit that is configured to couple to memory and manage access to the memory;

an input/output (I/O) agent circuit that includes a transaction pipeline and one or more counters; and a first interconnect that is configured to couple the memory controller circuit and the I/O agent circuit;

a second interconnect that is configured to couple the I/O agent circuit and one or more peripheral components;

wherein the I/O agent circuit is configured to bridge the one or more peripheral components from the second interconnect to the first interconnect and implement coherency mechanisms for transactions associated with the one or more peripheral components, and wherein the I/O agent circuit is configured to:

assign a first counter of the one or more counters to a specific transaction type;

increment the first counter assigned to the specific transaction type in response to allocating one or more transactions of a particular, different transaction type than the specific transaction type;

based on receiving a request to process a transaction having the specific transaction type, bind the transaction to the first counter such that the transaction is prevented from issuing to the transaction pipeline while the one or more transactions have not been completed, wherein the transaction is associated with a particular one of the one or more peripheral components; and issue the transaction to the transaction pipeline subsequent to detecting, based on the first counter, that the one or more transactions have been completed.

17. The medium of claim 16, wherein the input/output (I/O) agent circuit is configured to:

perform at least two issuances of a given transaction of the one or more transactions to the transaction pipeline, wherein transaction pipeline is configured to:

increment the first counter on an initial pipeline pass of the given transaction; and decrement the first counter on a subsequent pipeline pass of the given transaction.

18. The medium of claim 16, wherein the I/O agent circuit is further configured to:

based on receiving the request to process the transaction, initialize a second counter and assign the second counter to the specific transaction type; and cease to increment the first counter while the first counter is bound to the transaction.

19. The medium of claim 16, wherein the I/O agent circuit is further configured to:

based on a retirement of the transaction, release the first counter to the one or more counters such that the first counter is available to bind to another transaction.

20. The medium of claim 16, wherein the I/O agent circuit is configured to issue the transaction to the transaction pipeline based further on the transaction being the oldest pending transaction of the specific transaction type.

* * * * *